(12) United States Patent
Zhang et al.

(10) Patent No.: US 7,991,607 B2
(45) Date of Patent: Aug. 2, 2011

(54) TRANSLATION AND CAPTURE ARCHITECTURE FOR OUTPUT OF CONVERSATIONAL UTTERANCES

(75) Inventors: Zhengyou Zhang, Bellevue, WA (US); David W. Williams, Woodinville, WA (US); Yuan Kong, Kirkland, WA (US); Zicheng Liu, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 870 days.

(21) Appl. No.: 11/167,870

(22) Filed: Jun. 27, 2005

(65) Prior Publication Data

US 2006/0293874 A1 Dec. 28, 2006

(51) Int. Cl.
*G06F 17/28* (2006.01)
(52) U.S. Cl. ............... 704/2; 704/4; 704/5; 704/6
(58) Field of Classification Search .................. None
See application file for complete search history.

(56) References Cited

U.S. PATENT DOCUMENTS

| | | | |
|---|---|---|---|
| 5,493,692 A | 2/1996 | Theimer et al. | |
| 5,528,491 A * | 6/1996 | Kuno et al. | 704/9 |
| 5,544,321 A | 8/1996 | Theimer et al. | |
| 5,555,376 A | 9/1996 | Theimer et al. | |
| 5,603,054 A | 2/1997 | Theimer et al. | |
| 5,611,050 A | 3/1997 | Theimer et al. | |
| 5,812,865 A | 9/1998 | Theimer et al. | |
| 5,917,944 A * | 6/1999 | Wakisaka et al. | 382/190 |
| 5,953,693 A * | 9/1999 | Sakiyama et al. | 704/3 |
| 6,148,105 A * | 11/2000 | Wakisaka et al. | 382/190 |
| 6,370,498 B1 * | 4/2002 | Flores et al. | 704/3 |
| 6,466,232 B1 | 10/2002 | Newell et al. | |
| 6,513,046 B1 | 1/2003 | Abbott, III et al. | |
| 6,549,915 B2 | 4/2003 | Abbott, III et al. | |
| 6,747,675 B1 | 6/2004 | Abbott et al. | |
| 6,791,580 B1 | 9/2004 | Abbott et al. | |
| 6,801,223 B1 | 10/2004 | Abbott et al. | |

(Continued)

FOREIGN PATENT DOCUMENTS

WO 9800787 1/1998

OTHER PUBLICATIONS

Andy Harter, et al., A Distributed Location System for the Active Office, IEEE Network, 1994, pp. 62-70.

(Continued)

*Primary Examiner* — Leonard Saint Cyr
(74) *Attorney, Agent, or Firm* — Lee & Hayes, PLLC

(57) ABSTRACT

Architecture that combines capture and translation of concepts, goals, needs, locations, objects, locations, and items (e.g., sign text) into complete conversational utterances that take a translation of the item, and morph it with fluidity into sets of sentences that can be echoed to a user, and that the user can select to communicate speech (or textual utterances). A plurality of modalities that process images, audio, video, searches and cultural context, for example, which are representative of at least context and/or content, and can be employed to glean additional information regarding a communications exchange to facilitate more accurate and efficient translation. Gesture recognition can be utilized to enhance input recognition, urgency, and/or emotional interaction, for example. Speech can be used for document annotation. Moreover, translation (e.g., speech to speech, text to speech, speech to text, handwriting to speech, text or audio, ... ) can be significantly improved in combination with this architecture.

17 Claims, 18 Drawing Sheets

U.S. PATENT DOCUMENTS

| | | | |
|---|---|---|---|
| 6,812,937 | B1 | 11/2004 | Abbott et al. |
| 6,820,237 | B1* | 11/2004 | Abu-Hakima et al. ........ 715/210 |
| 6,842,877 | B2 | 1/2005 | Robarts et al. |
| 7,054,804 | B2* | 5/2006 | Gonzales et al. ................. 704/8 |
| 2001/0040590 | A1 | 11/2001 | Abbott et al. |
| 2001/0040591 | A1 | 11/2001 | Abbott et al. |
| 2001/0043231 | A1 | 11/2001 | Abbott et al. |
| 2001/0043232 | A1 | 11/2001 | Abbott et al. |
| 2001/0056342 | A1* | 12/2001 | Piehn et al. ....................... 704/3 |
| 2002/0032689 | A1 | 3/2002 | Abbott, III et al. |
| 2002/0044152 | A1 | 4/2002 | Abbott, III et al. |
| 2002/0052930 | A1 | 5/2002 | Abbott et al. |
| 2002/0052963 | A1 | 5/2002 | Abbott et al. |
| 2002/0054130 | A1 | 5/2002 | Abbott, III et al. |
| 2002/0054174 | A1 | 5/2002 | Abbott et al. |
| 2002/0078204 | A1 | 6/2002 | Newell et al. |
| 2002/0080155 | A1 | 6/2002 | Abbott et al. |
| 2002/0080156 | A1 | 6/2002 | Abbott et al. |
| 2002/0083025 | A1 | 6/2002 | Robarts et al. |
| 2002/0083158 | A1 | 6/2002 | Abbott et al. |
| 2002/0087525 | A1 | 7/2002 | Abbott et al. |
| 2002/0099817 | A1 | 7/2002 | Abbott et al. |
| 2002/0191847 | A1* | 12/2002 | Newman et al. .............. 382/176 |
| 2003/0004702 | A1* | 1/2003 | Higinbotham .................... 704/2 |
| 2003/0046401 | A1 | 3/2003 | Abbott et al. |
| 2003/0069997 | A1* | 4/2003 | Bravin et al. ................. 709/250 |
| 2003/0154476 | A1 | 8/2003 | Abbott, III et al. |
| 2003/0187681 | A1* | 10/2003 | Spain ................................ 705/1 |
| 2004/0167771 | A1* | 8/2004 | Duan et al. ...................... 704/10 |
| 2005/0034078 | A1 | 2/2005 | Abbott et al. |
| 2005/0123200 | A1* | 6/2005 | Myers et al. .................. 382/182 |
| 2005/0234700 | A1* | 10/2005 | Li et al. ............................. 704/2 |

OTHER PUBLICATIONS

Guanling Chen, et al., A Survey of Context-Aware Mobile Computing Research, Dartmouth Computer Science Technical Report, 2000, 16 pages.

William Noah Schilt, A System Architecture for Context-Aware Mobile Computing, Columbia University, 1995, 153 pages.

Mike Spreitzer, et al., Providing Location Information in a Ubiquitous Computing Environment, SIGOPS '93, 1993, pp. 270-283.

Marvin Theimer, et al., Operating System Issues for PDAs, In Fourth Workshop on Workstation Operating Systems, 1993, 7 pages.

Roy Want, Active Badges and Personal Interactive Computing Objects, IEEE Transactions on Consumer Electronics, 1992, 11 pages, vol. 38—No. 1.

Bill N. Schilit, et al., The ParcTab Mobile Computing System, IEEE WWOS-IV, 1993, 4 pages.

Bill Schilit, et al., Context-Aware Computing Applications, In Proceedings of the Workshop on Mobile Computing Systems and Applications, Dec. 1994. pp. 85-90.

Bill N. Schilit, et al., Customizing Mobile Applications, Proceedings USENIX Symposium on Mobile and Location Independent Computing, Aug. 1993, 9 pages.

Mike Spreitzer, et al., Architectural Considerations for Scalable, Secure, Mobile Computing with Location Information, in The 14th International Conference on Distributed Computing Systems, Jun. 1994, pp. 29-38.

Mike Spreitzer et al., Scalable, Secure, Mobile Computing with Location Information, Communications of the ACM, Jul. 1993, 1 page, vol. 36—No. 7.

Roy Want, et al., The Active Badge Location System, ACM Transactions on Information Systems, Jan. 1992, pp. 91-102, vol. 10—No. 1.

Mark Weiser, Some Computer Science Issues in Ubiquitous Computing, Communications of the ACM, Jul. 1993, pp. 75-84, vol. 36—No. 7.

M. Billinghurst, et al., An Evaluation of Wearable Information Spaces, Proceedings of the Virtual Reality Annual International Symposium, 1998, 8 pages.

Bradley J. Rhodes, Remembrance Agent: A continuously running automated information retrieval system, The Proceedings of the First International Conference on the Practical Application of Intelligent Agents and Multi Agent Technology, 1996, pp. 487-495.

Eric Horvitz, et al., In Pursuit of Effective Handsfree Decision Support: Coupling Bayesian Inference, Speech Understanding, and User Models, 1995, 8 pages.

Bradley J. Rhodes, The Wearable Remembrance Agent: A System for Augmented Theory, The Proceedings of The First International Symposium on Wearable Computers, Oct. 1997, pp. 123-128.

Eric Horvitz, et al., Attention-Sensitive Alerting in Computing Systems, Microsoft Research, Aug. 1999.

Bill N. Schilit, et al., Disseminationg Active Map Information to Mobile Hosts, IEEE Network, 1994, pp. 22-32, vol. 8—No. 5.

Mark Billinghurst, et al., Wearable Devices: New Ways to Manage Information, IEEE Computer Society, Jan. 1999, pp. 57-64.

Thad Eugene Starner, Wearable Computing and Contextual Awareness, Massachusetts Institute of Technology, Jun. 1999, 248 pages.

Bradley J. Rhodes, The Wearable Remembrance Agent: A System for Augmented Memory, Personal Technologies Journal Special Issue on Wearable Computing, 1997, 12 pages.

Workshop on Wearable Computing Systems, Aug. 19-21, 1996.

Mark Billinghurst, Research Directions in Wearable Computing, University of Washington, May 1998, 48 pages.

Mark Weiser, The Computer for the 21st Century, Scientific American, Sep. 1991, 8 pages.

T. Joachims, Text categorization with support vector machines: learning with many relevant features, Machine Learning, European Conference on Machine Learning, Apr. 21, 1998, pp. 137-142.

International Search Report dated Sep. 29, 2003 for PCT Application Serial No. 00/20685, 3 Pages.

Robert M. Losee, Jr., Minimizing information overload: the ranking of electronic messages, Journal of Information Science 15, Elsevier Science Publishers B.V., 1989, pp. 179-189.

\* cited by examiner

TRANSLATION AND CAPTURE ARCHITECTURE FOR OUTPUT OF CONVERSATIONAL UTTERANCES

BACKGROUND

The advent of global communications networks such as the Internet has served as a catalyst for the convergence of computing power and services in portable computing devices. For example, in the recent past, portable devices such as cellular telephones and personal data assistants (PDAs) have employed separate functionality for voice communications and personal information storage, respectively. Today, these functionalities can be found in a single portable device, for example, a cell phone that employs multimodal functionality via increased computing power in hardware and software. Such devices are more commonly referred to as "smartphones."

With the technological advances in handheld and portable devices, there is an ongoing and increasing need to maximize the benefit of these continually emerging technologies. Given the advances in storage and computing power of such portable wireless computing devices, they now are capable of handling many types of disparate data types such as images, video clips, audio data, and electronic organizers for managing and organizing a variety of PIM (personal information manager) data, for example. This data is typically utilized separately for specific purposes.

The Internet has also brought internationalization by bringing millions of network users into contact with one another via mobile devices (e.g., telephones), e-mail, websites, etc., some of which can provide some level of textual translation. For example, a user can select their browser to install language plug-ins which facilitate some level of textual translation from one language text to another when the user accesses a website in a foreign country. However, the world is also becoming more mobile. More and more people are traveling for business and for pleasure. This presents situations where people are now face-to-face with individuals and/or situations in a foreign country where language barriers can be a problem. A mechanism is needed that can exploit the increased computing power of portable devices to enhance user experience.

SUMMARY

The following presents a simplified summary in order to provide a basic understanding of some aspects of the disclosed innovation. This summary is not an extensive overview, and it is not intended to identify key/critical elements or to delineate the scope thereof. Its sole purpose is to present some concepts in a simplified form as a prelude to the more detailed description that is presented later.

Disclosed herein is architecture the exploits advances in computing power to enhance user experience. A plurality of sensing means are employed to combine the capture and translation of concepts, goals, needs, locations, objects, locations, and items (e.g., including text on signs) into complete conversational utterances that take a translation of the item, for example, and morph it with fluidity into sets of sentences that can be echoed to a user, and that the user can select to communicate speech (or textual utterances).

In one aspect of the innovation, translation (e.g., speech to speech, text to speech, speech to text, handwriting to speech, text or audio, . . . ) is significantly improved by taking advantage of context and/or content data that can be received through multiple modalities and processed to provide the translated output.

In another aspect, the user is provided with an interim translation to which the user can provide feedback that is used to improve understandability of the translated output to a recipient.

In yet another aspect of the subject innovation, the plurality of sensing means can be prioritized according to the type of context in which the user is located. In other words, image capture subsystems, for example, can be employed over text and/or audio input systems in generating the translated output.

To the accomplishment of the foregoing and related ends, certain illustrative aspects of the disclosed innovation are described herein in connection with the following description and the annexed drawings. These aspects are indicative, however, of but a few of the various ways in which the principles disclosed herein can be employed and is intended to include all such aspects and their equivalents. Other advantages and novel features will become apparent from the following detailed description when considered in conjunction with the drawings.

DETAILED DESCRIPTION

Figure 1:
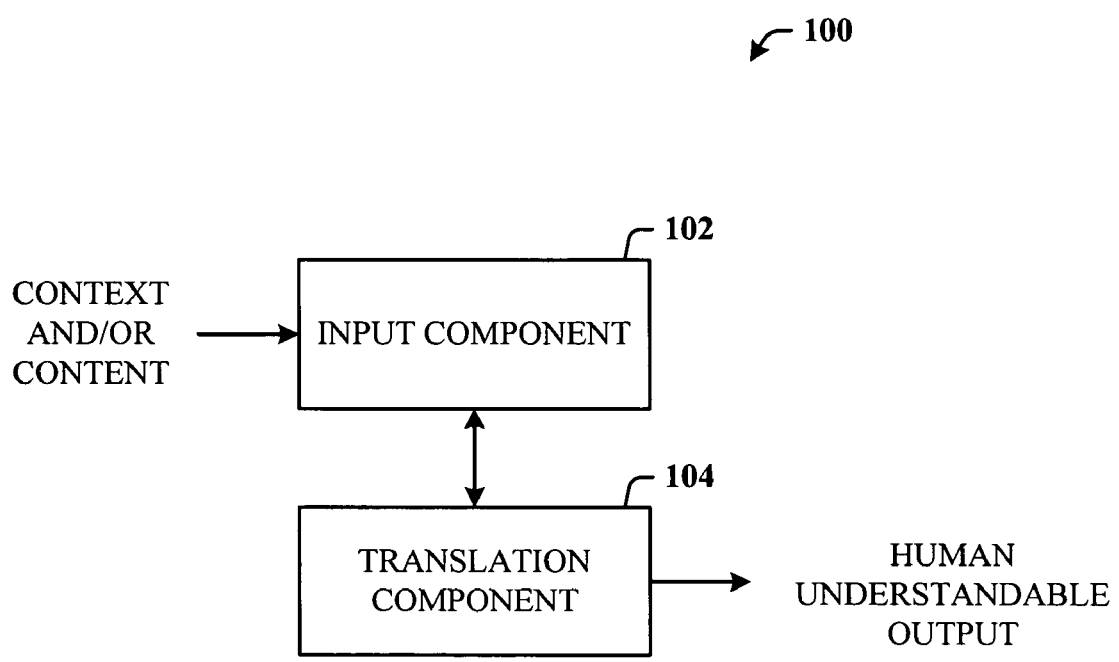
FIG. 1 illustrates a system that facilitates translation according to an innovative aspect.

The innovation is now described with reference to the drawings, wherein like reference numerals are used to refer to like elements throughout. In the following description, for purposes of explanation, numerous specific details are set forth in order to provide a thorough understanding thereof. It may be evident, however, that the innovation can be practiced without these specific details. In other instances, well-known structures and devices are shown in block diagram form in order to facilitate a description thereof.

As used in this application, the terms "component" and "system" are intended to refer to a computer-related entity, either hardware, a combination of hardware and software, software, or software in execution. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers.

Disclosed herein is a means of combining the capture and translation of concepts, goals, needs, locations, objects, locations, and items (e.g., including text on signs) into complete conversational utterances that take a translation of the item, and morph it with fluidity into sets of sentences that can be echoed to a user, and that the user can select to communicate speech (or text utterances).

Translation (speech to speech, text to speech, speech to text, handwriting to speech, text or audio, etc.) can be significantly improved by taking advantage of context and/or content that can be made available through multiple modalities. For example, cameras, audio, video, searches, cultural context can be employed to glean more information regarding a communications exchange to facilitate accurate and efficient translation.

Gesture recognition can be employed to enhance input recognition, urgency and/or emotional interaction, for example. Speech can be used to annotate documents, and speech translation can provide users, e.g., travelers who are confronted with an unknown language at a place that they are visiting. The subject innovation provides a mechanism via selection, or input via such modes as image capture of objects or text, to both capture and translate the concept, item, goal, intention, or image, and then integrating and communicating about the concept with tools that provide sets of guesses that are echoed back to the user, as phrases and sentences users might wish to communicate.

Referring now to the drawings, FIG. 1 illustrates a system 100 that facilitates data translation according to an innovative aspect. The system 100 includes an input component 102 that processes input data from a number of modalities that represent at least context and/or content. For example, cameras, audio, video, searches, and cultural context can be employed to glean additional information regarding a communications exchange to facilitate more accurate and efficient translation. Gesture recognition can be utilized to enhance input recognition, urgency, and/or emotional interaction, for example. Additionally, speech can be used to annotate documents.

In support thereof, the system 100 further includes a translation component 104 that receives the processed context and/or content data from the input component 102, translates the processed data into an understandable output that includes at least one of text and audible utterances, and outputs the text and audible utterances in an understandable way for perception by a user or users.

For example, it would be useful to provide a user who travels, and who does not understand the language at a place that is being visited, a simple means by which selection or input, via such modalities as image capture of objects or text, to both capture and translate the concept, item, goal, intention, and/or image (e.g., capturing or inputting a text snippet of a sign). Thereafter, this information can then be integrated and processed with tools that provide sets of guesses that are echoed back to the user as phrases and/or sentences the user might wish to communicate. The guesses can be ordered by likelihood, where such ordering can also be influenced by listening to an utterance of the user, e.g., "Can I order this?"

Figure 2:
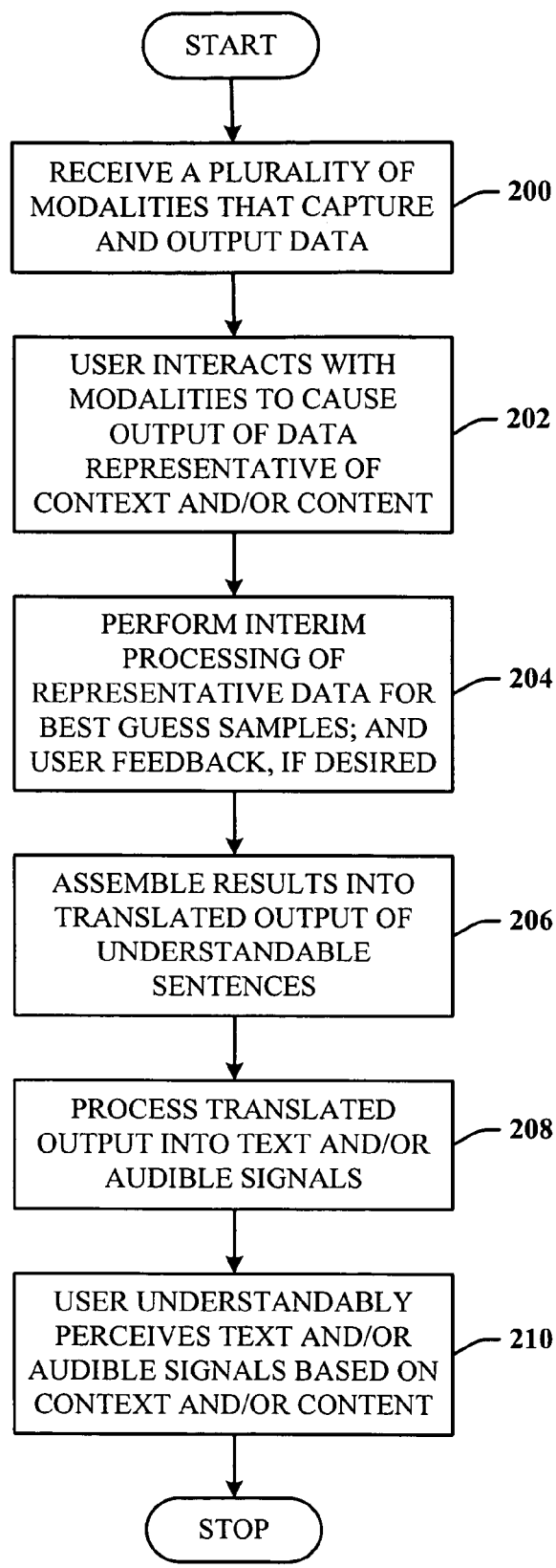
FIG. 2 illustrates a methodology of translating context and/or content in accordance with an innovative aspect.

FIG. 2 illustrates a methodology of translating context and/or content in accordance with an innovative aspect. While, for purposes of simplicity of explanation, the one or more methodologies shown herein, e.g., in the form of a flow chart or flow diagram, are shown and described as a series of acts, it is to be understood and appreciated that the subject innovation is not limited by the order of acts, as some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the innovation.

At 200, a plurality of modalities is received that capture information and output representative data. At 202, the user interacts with one or more of the modalities, or causes automatic operation thereof, to output data that is representative of the user context and/or content. At 204, interim processing is performed that processes the representative data into best guess samples of words and/or phrases, and allows user feedback, if desired. For example, if the user is experiencing a high degree of success of translation in the particular context and/or with the content, the user can choose to bypass the user feedback process. At 206, the interim results are assembled into a translated output of understandable sentences. At 208, the translated output is processed into understandable text and/or audible signals (e.g., speech). At 210, the understandable output is presented to a user or recipients for perception, either as speech in an understandable language, or text in the understandable language, or both speech and text, and based on the context and/or content of the input.

Figure 3:
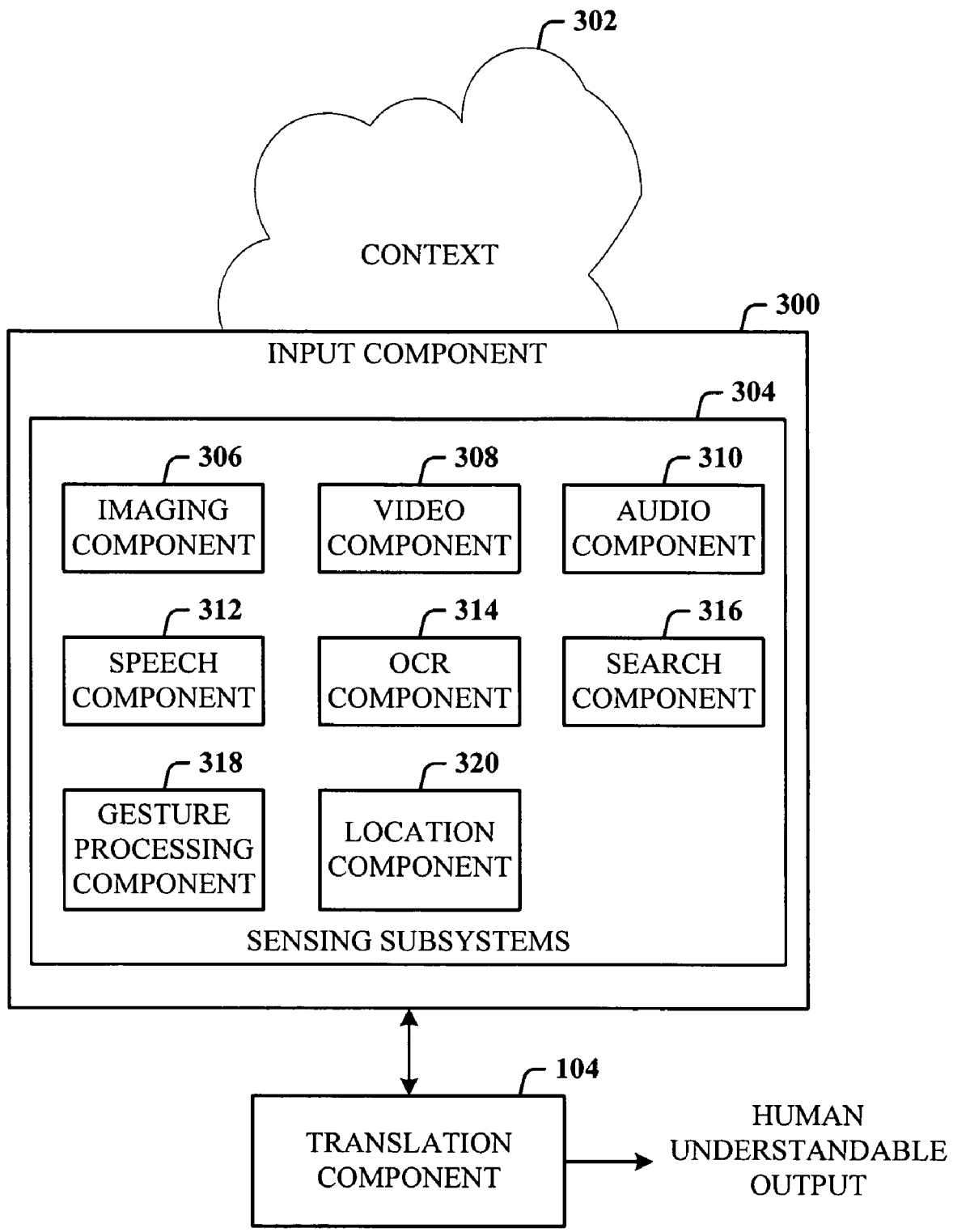
FIG. 3 illustrates a schematic block diagram of an exemplary input component.

Referring now to FIG. 3, there is illustrated a schematic block diagram of an exemplary input component 300. The input component 300 facilitates enablement of sensing, capturing, and processing the input data representative of at least content and a user context 302. In support thereof, the input component 300 includes sensing subsystems 304 (or modalities) that generally represent a plurality of different sensing subcomponents for collecting information about the user context and/or content. For example, an imaging component 306 (e.g., a camera or imager) can be employed for taking picture snapshots of a menu (for content), a road sign, or any other item that can provide a clue as to the user content/context 302. A video component 308 (e.g., a video camera) facilitates the capture of video clips of the context 302. Thereafter, video processing can be employed to provide a clue as to the user context 302. An audio component 310 (e.g., a microphone and accompanying electronics) facilitates the recording of audio data that can be native to the particular context.

A speech component 312 processes speech input of the user or others. Thus, this component 312 can also include a library of language components (not shown) that facilitate recognition of the input speech language. Such speech can be converted into text with/without errors. An optical recognition component (OCR) 314 processes imaged text captured by the image component 306 and the video component 308, for example. As indicated supra, the user can enhance translation accuracy by capturing a variety of data for clues as to context and content. In one example, the user can take a snapshot of a road sign, business sign, menu, the text of which can then be processed to improve the translation success for understandable output.

The sensing subsystems 304 can also include a search component 316 that can be activated manually or automatically to perform searches for data related to contextual and/or content information. The search can be a local search of data stored in a local datastore (not shown). Alternatively, or in combination therewith, the search can be conducted over a wireless and/or wired regime (e.g., the Internet) utilizing network search engines. In any case, the search component 316 can receive search terms for query from any of the components of the sensing subsystems 304. In another implementation, the search terms can be generated from another subsystem (not shown) that receives and processes the output data from select ones of the sensing subsystems 304.

The sensing subsystems 304 can also include a gesture component 318 that facilitates the processing of user gestures as captured by the imaging component 306 and/or the video component 308. Gesture recognition can be utilized to enhance input recognition, urgency, and/or emotional interaction, for example. A location component 320 facilitates determination of the geographic location of the user. This component 320 can include a global positioning system (GPS) technology, and/or other suitable triangulation technology. Alternatively, the location component 320 can function in cooperation with one or more of the other sensing subsystems 304 to derive the user location. For example, based on image processing of the imaging component 306, OCR output of the OCR component 314, and results of the search component 316, it can be deduced with some degree of success that the location is X. Ultimately, the input component 300 outputs processed data to the translation component 104 such that the human understandable output can be achieved.

Figure 4:
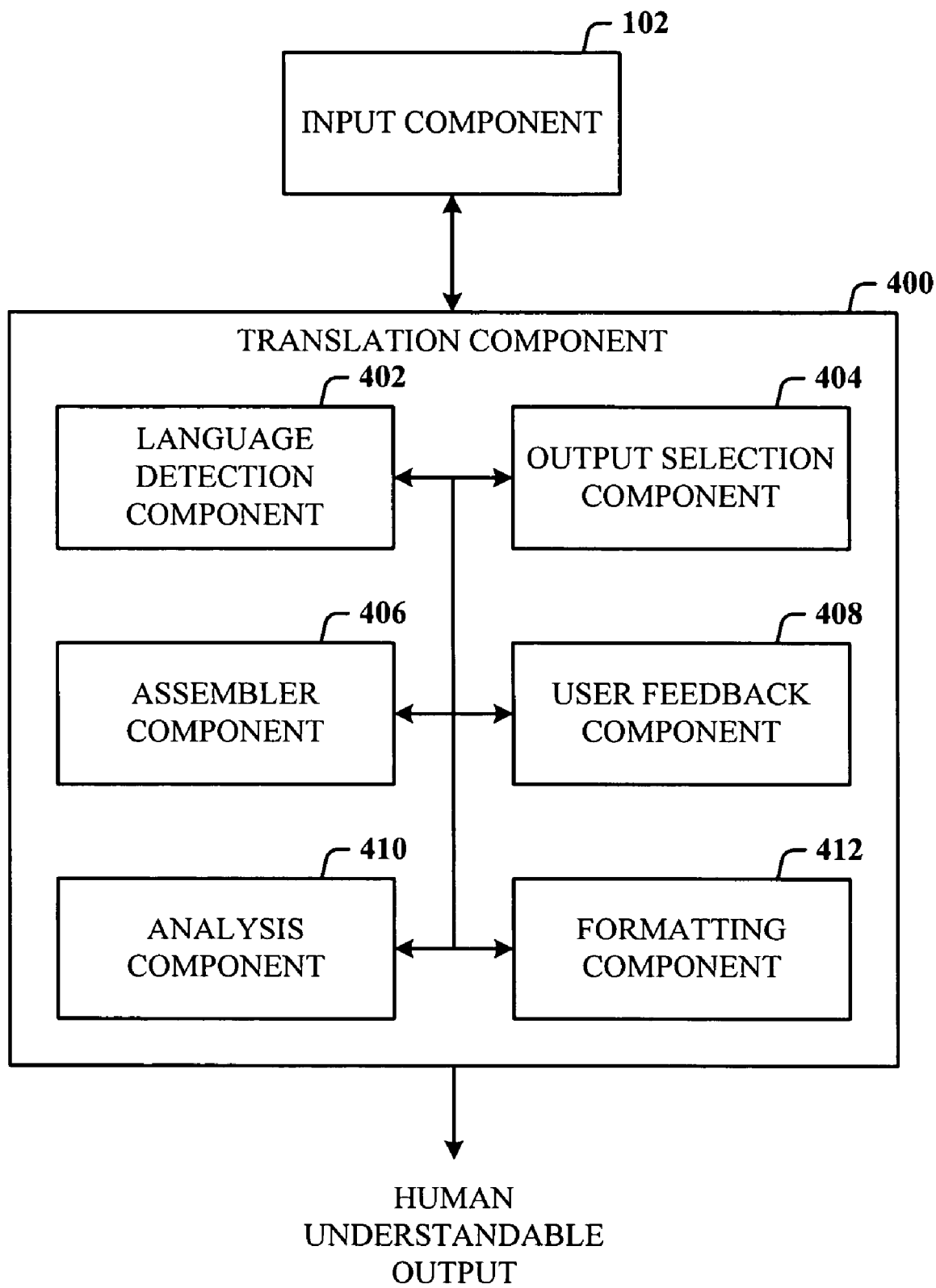
FIG. 4 illustrates a more detailed schematic block diagram of a translation component in accordance with another aspect.

FIG. 4 illustrates a more detailed schematic block diagram of a translation component 400 in accordance with another aspect. Input related to user context and/or content is received from the input component 102 into the translation component 400 for translation. One of the first tasks, if not already manually configured by the user, is to automatically determine the context language. Accordingly, a language detection component 402 is provided that receives all or a part of the output from the input component 102 to determine what language is being input by the user. This finds applicability where the user and a recipient cannot speak each other language. Thus, although the user sets the device to a default input language of the user, the recipient could then speak into the device, in response to which the device or system needs to quickly determine the language of the recipient for translation purposes. Generally, the user device can default to the user selection on power-up. However, this need not be the case, since the innovative architecture is suitably robust to determine the user input language via speech recognition processing, at least, and more generally, by content analysis of one or more of the other sensing subsystems 304 of FIG. 3.

The translation component 400 can also include an output selection component 404 via which the user can manually select the type of understandable output, for example, audio (e.g., speech), text, or a combination of both. This can also be configured to occur automatically, such that no user input is required when deciding in what format the understandable output will be. An assembler component 406 receives the textual content, for example, and assembles the text in user-understandable phrases and/or sentences for viewing, hearing, and/or both, and the intended recipient.

A user feedback component 408 facilitates user input during the translation process such that if the output is perceived as flawed, to some extent, the user can initiate reprocessing of the inputs. Alternatively, the user can input further information (e.g., speech) that can be processed to output a more accurate representation for human understanding. This process can be repeated as many times as desired; however, feedback by an intended recipient can be a valid indicator that the translation was successful or unsuccessful.

An analysis component 410 monitors and controls one or more component processes of both the input component 102 and the translation component 400. For example, the analysis component 410 can provide likely guesses of text such that understandable phrases and/or sentences can be formed. These likely guesses can be ranked according to a number of different input data. For example, user feedback can impact the rankings, allowing for a more likely word to be selected, and a phrase and/or sentence to be assembled and formed. Additionally, the analysis component 410 can determine which sensing subsystems 304 of FIG. 3 can or should be employed to aid in content and/or context determination and the translation process.

Finally, a formatting component 412 receives the assembled data of understandable words, phrases and/or sentences from the assembler component 406 and processes it into text and/or audio for perception by the intended recipient.

Figure 5:
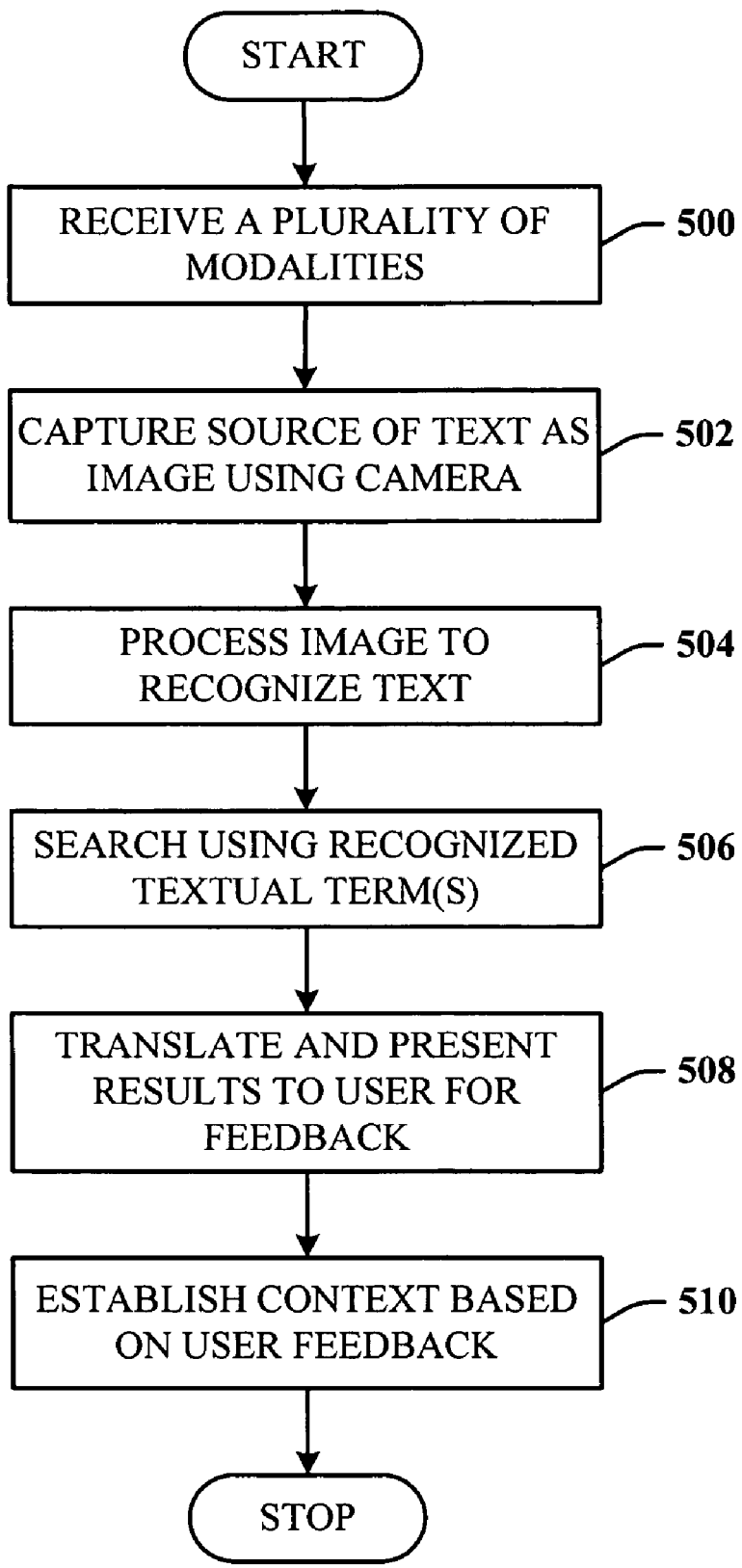
FIG. 5 illustrates a methodology of computing context based on text recognition of image content in accordance with an innovative aspect.

FIG. 5 illustrates a methodology of computing context based on text recognition of image content in accordance with an innovative aspect. At 500, a plurality of modalities is received that capture information and output representative data. At 502, text is captured from a source via an image from a camera, for example. At 504, the image is processed to recognize the text. At 506, once recognized, one or more of the text terms can be used as search terms. The search can be conducted against a local datastore, or remotely, against network (e.g., the Internet) sites and/or network-based resources. At 508, the search results can then be translated and presented to the user for user feedback as to accuracy and/or correctness. At 510, context can then be established based on the user feedback. If the user feedback is negative, the process can be repeated until user feedback is positive, thereby establishing the context.

Figure 6:
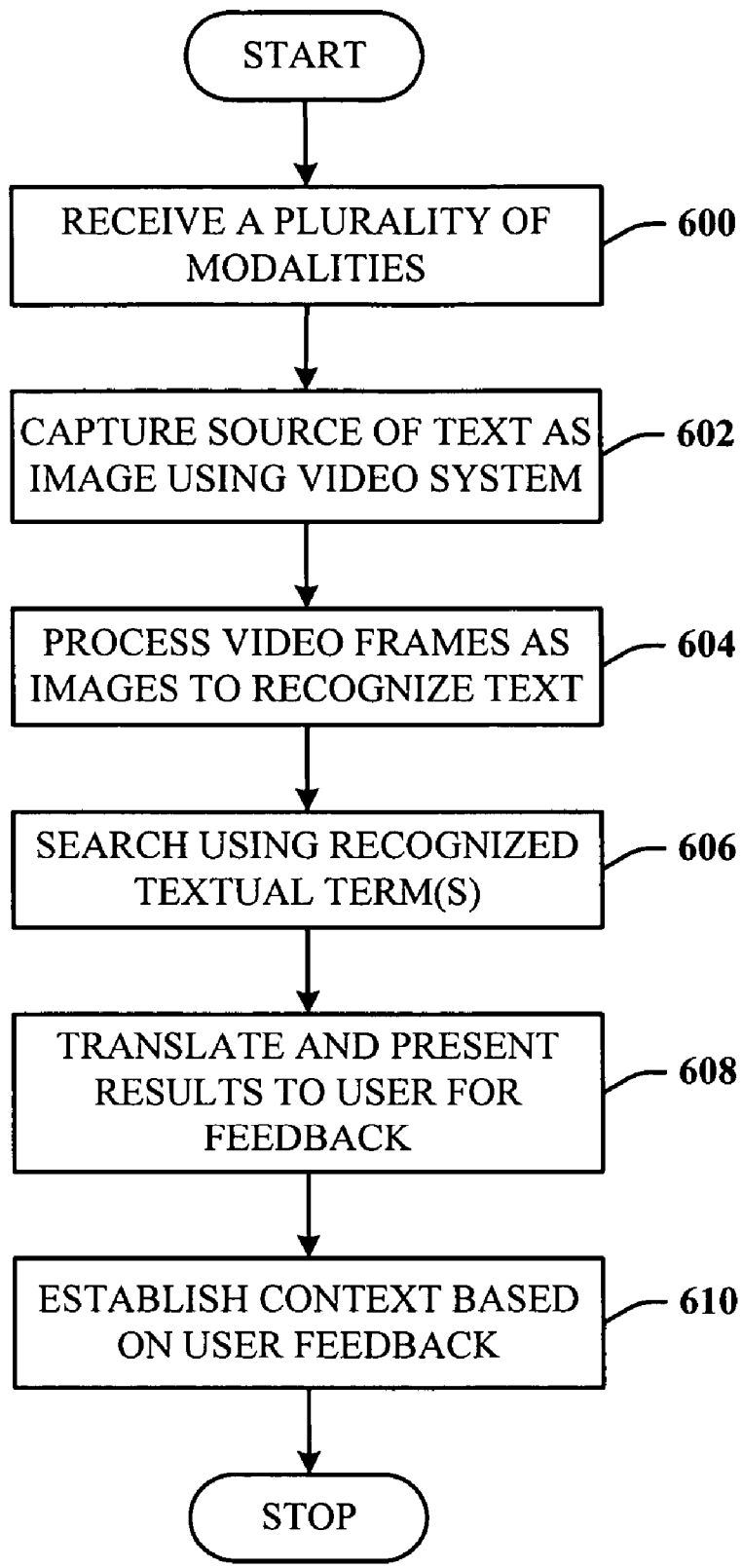
FIG. 6 illustrates a methodology of computing context based on text recognition of video content in accordance with an innovative aspect.

Referring now to FIG. 6, there is illustrated a methodology of computing context based on text recognition of video content in accordance with an innovative aspect. At 600, a plurality of modalities is received that capture information and output representative data. At 602, the source of the text is captured on video. At 604, video frames are processed as images to detect the textual content. At 606, a search can be conducted, against resources mentioned supra, using words or phrases of the textual content. At 608, the search results can be translated and presented to the user for user feedback. At 610, context can be established based on the user feedback.

As before, if the user feedback is negative, the process can be repeated until user feedback is positive, thereby establishing the context.

Figure 7:
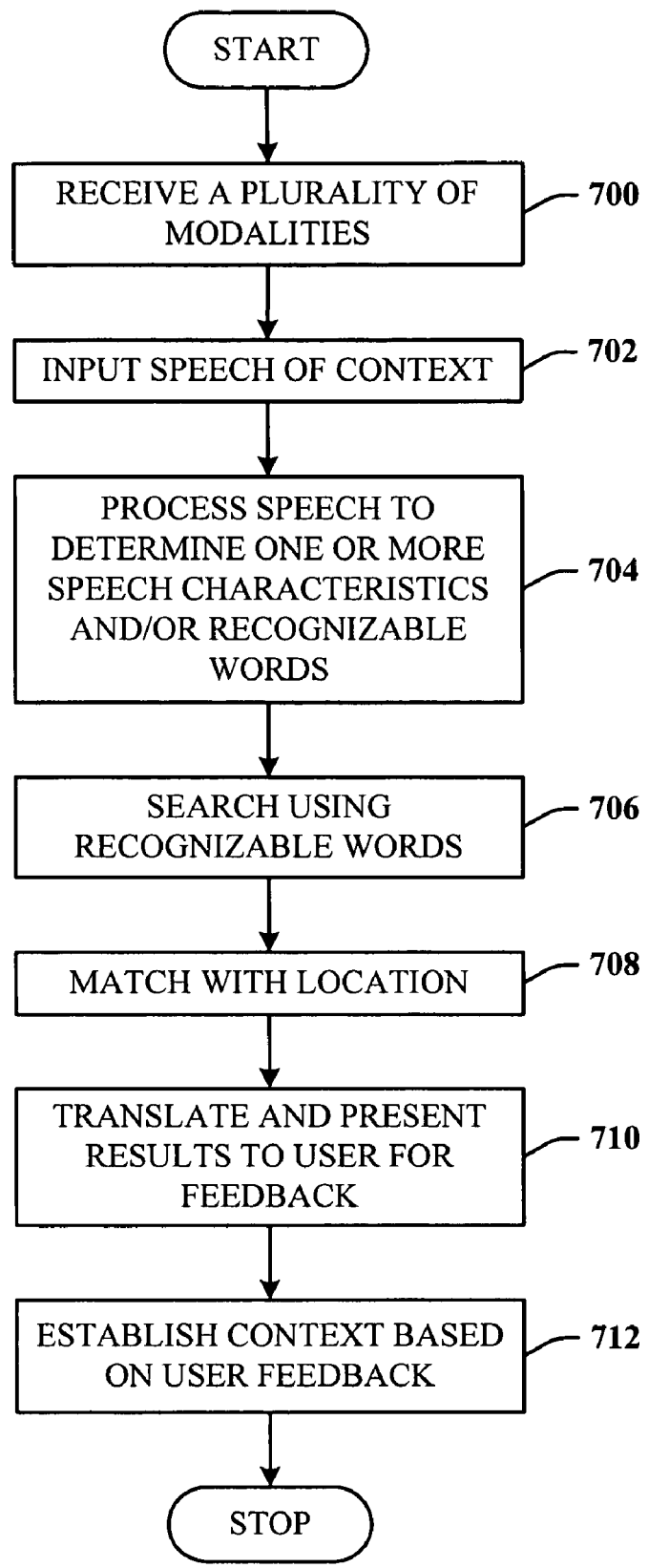
FIG. 7 illustrates of determining context based on speech input.

FIG. 7 illustrates a methodology of determining context based on speech input. At 700, a plurality of the modalities is received that capture information and output representative data. At 702, speech related to the context is input. At 704, the speech is processed to determine one or more speech characteristics and/or recognizable words. At 706, a search can be performed using the recognizable words and/or characteristics. At 708, the search results can be processed for a matching location. At 710, the location (or context) can then be translated and presented back to the user for user feedback. At 712, the selected context can then be affirmed by the user.

Figure 8:
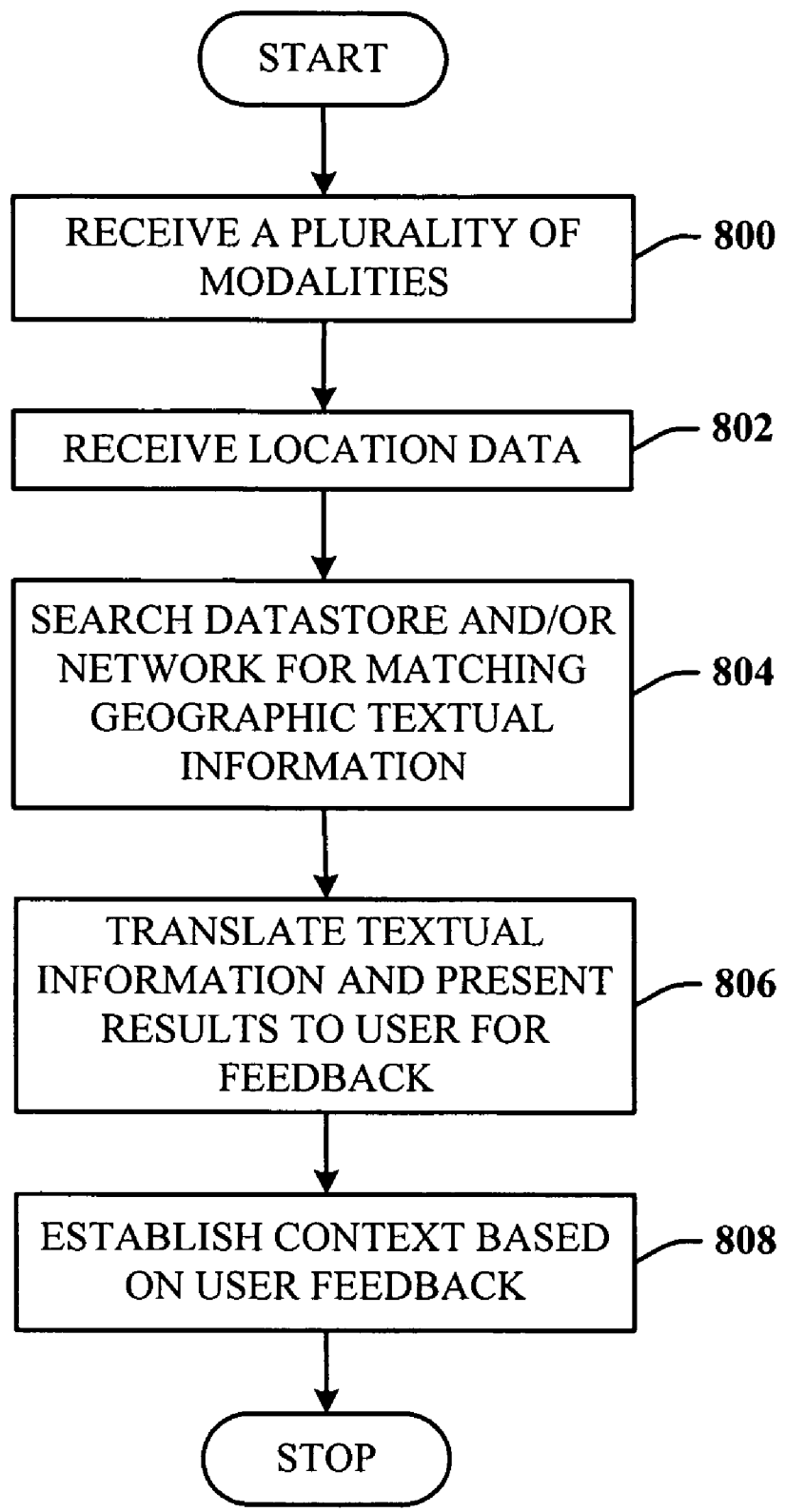
FIG. 8 illustrates of determining user context based on a location.

FIG. 8 illustrates a methodology of determining user context based on a location. At 800, a plurality of the modalities is received that capture information and output representative data. At 802, one of the modalities provides location information. This location information can be in the format of latitude/longitude information, for example. At 804, a search can be conducted against a local datastore using the location information, and/or against remote network-based resources to return matching geographical textual location information. At 806, the geographical textual information is translated and presented to the user for user feedback. At 808, the context can be affirmed by the user.

Figure 9:
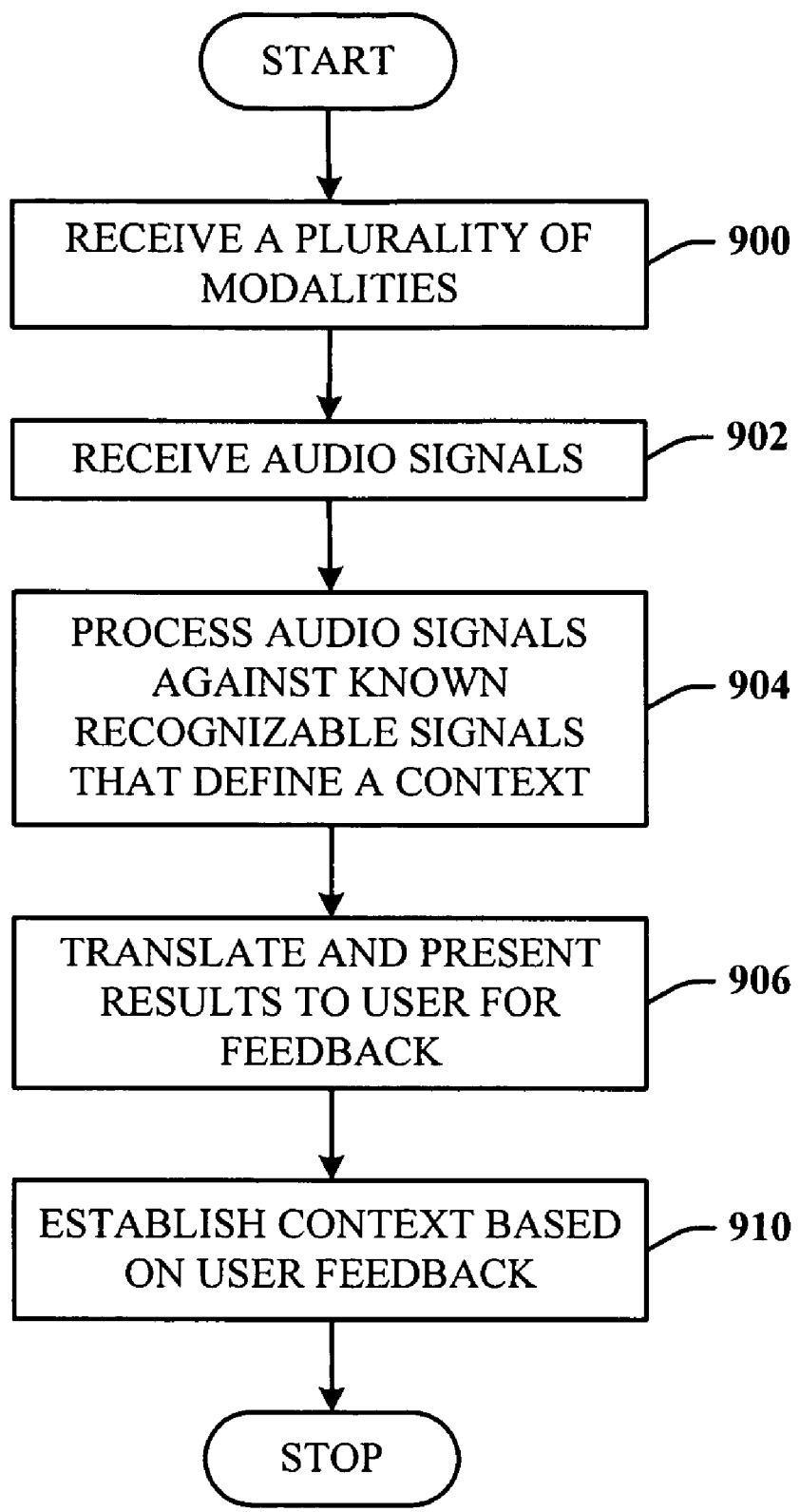
FIG. 9 illustrates a methodology of determining user context based on audio signal processing.

FIG. 9 illustrates a methodology of determining user context based on audio signal processing. At 900, a plurality of modalities is received that capture information and output representative data. At 902, audio can be recorded, which audio signals can include sounds, music, etc., that can be generally definable to a certain area. At 904, the audio signals are processed against a datastore of known recognizable sounds that are associated with known locations. Other sensed inputs can also be used such as speech and text, for example. At 906, the results are translated and presented for user feedback. At 908, the user can affirm the result, or cause the processed to be repeated until the context results are successful.

Figure 10:
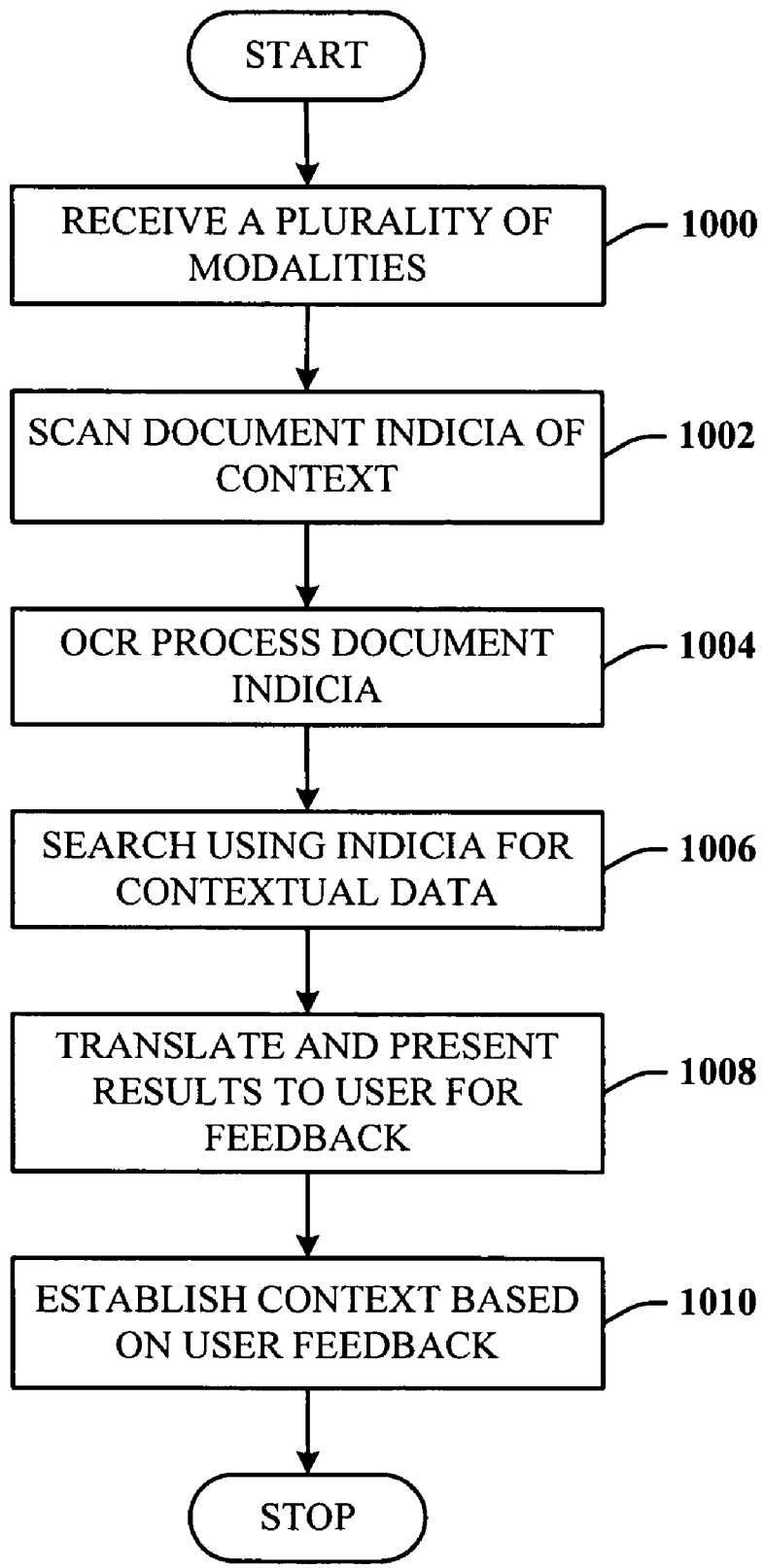
FIG. 10 illustrates a methodology of determining user context based on the content of scanned text.

FIG. 10 illustrates a methodology of determining user context based on the content of scanned text. At 1000, a plurality of modalities is received that capture information and output representative data. At 1002, document indicia can be scanned. At 1004, the indicia are OCR'd into likely text. At 1006, the text can then be used in a search process in order to identify the user context. At 1008, the search results are translated and presented to the user for user feedback. At 1010, the context is established based the user feedback.

Figure 11:
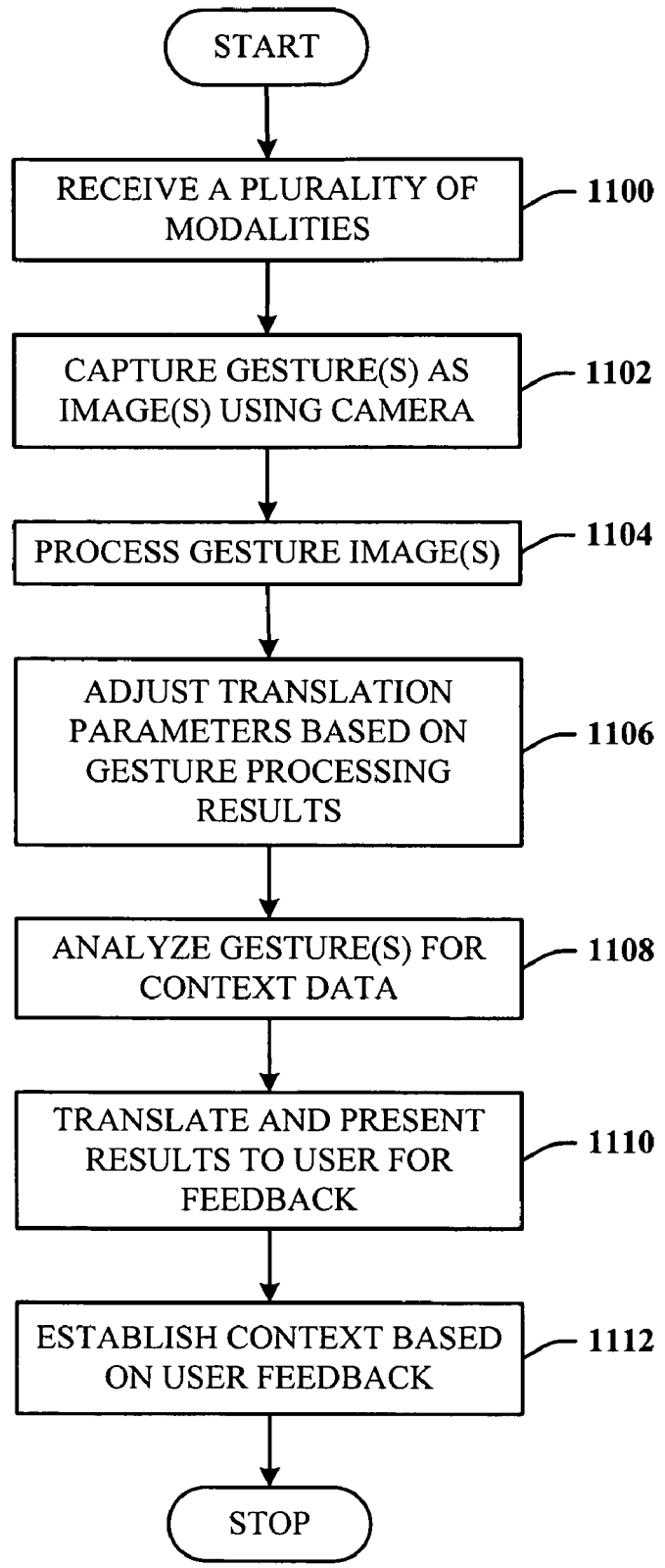
FIG. 11 illustrates a methodology of determining user context based on gesture recognition.

FIG. 11 illustrates a methodology of determining user context based on gesture recognition. At 1100, a plurality of modalities is received that capture information and output representative data. At 1102, the gesture(s) is captured via image and/or video camera. At 1104, the images and/or video frames are processed for gesture interpretation. Gesture recognition can be utilized to enhance input recognition, urgency, and/or emotional interaction, for example. Accordingly, one or more translation parameters can be adjusted based on the interpretive results of the gestures. At 1108, the gesture(s) is analyzed for contextual information and/or meaning. In other words, it is to be appreciated that a gesture can aid in identifying or narrowing information to determine the user context. In another usage, hand signals can be analyzed that can aid in identifying letters and/or words, as those gestures associated with signing. At 1110, the gesture results are translated and presented to the user for user feedback as to the context.

Figure 12:
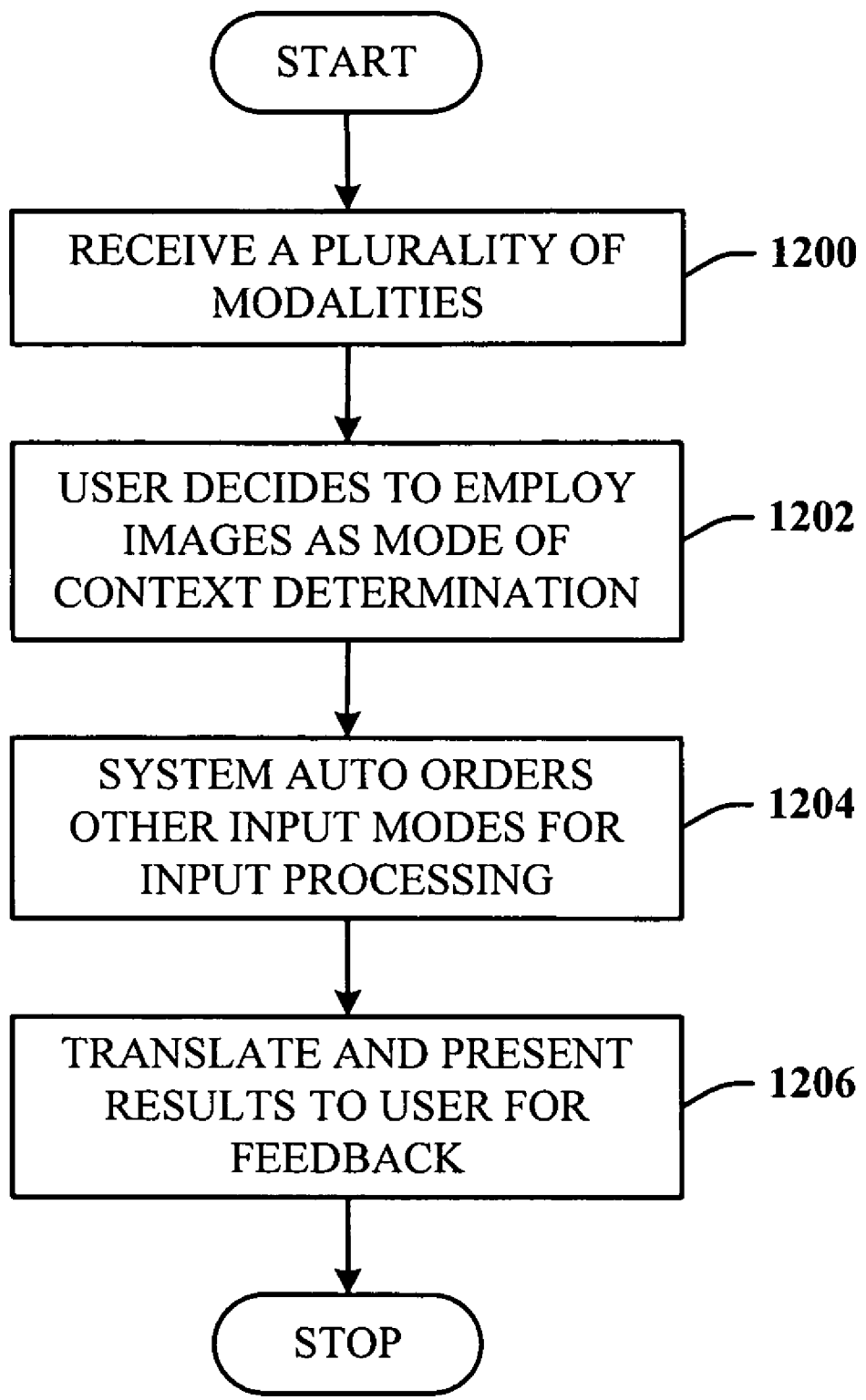
FIG. 12 illustrates a methodology of automatic ordering of modalities based on use of a first sensing system.

FIG. 12 illustrates a methodology of automatic ordering of modalities based on use of a first sensing system. At 1200, a plurality of modalities is received that capture information and output representative data. At 1202, the user selects a first mode for data input. At 1204, the system automatically order the remaining input modes for data capture based on the user-selected mode. At 1206, the results are translated and presented to the user in an understandable output.

Figure 13:
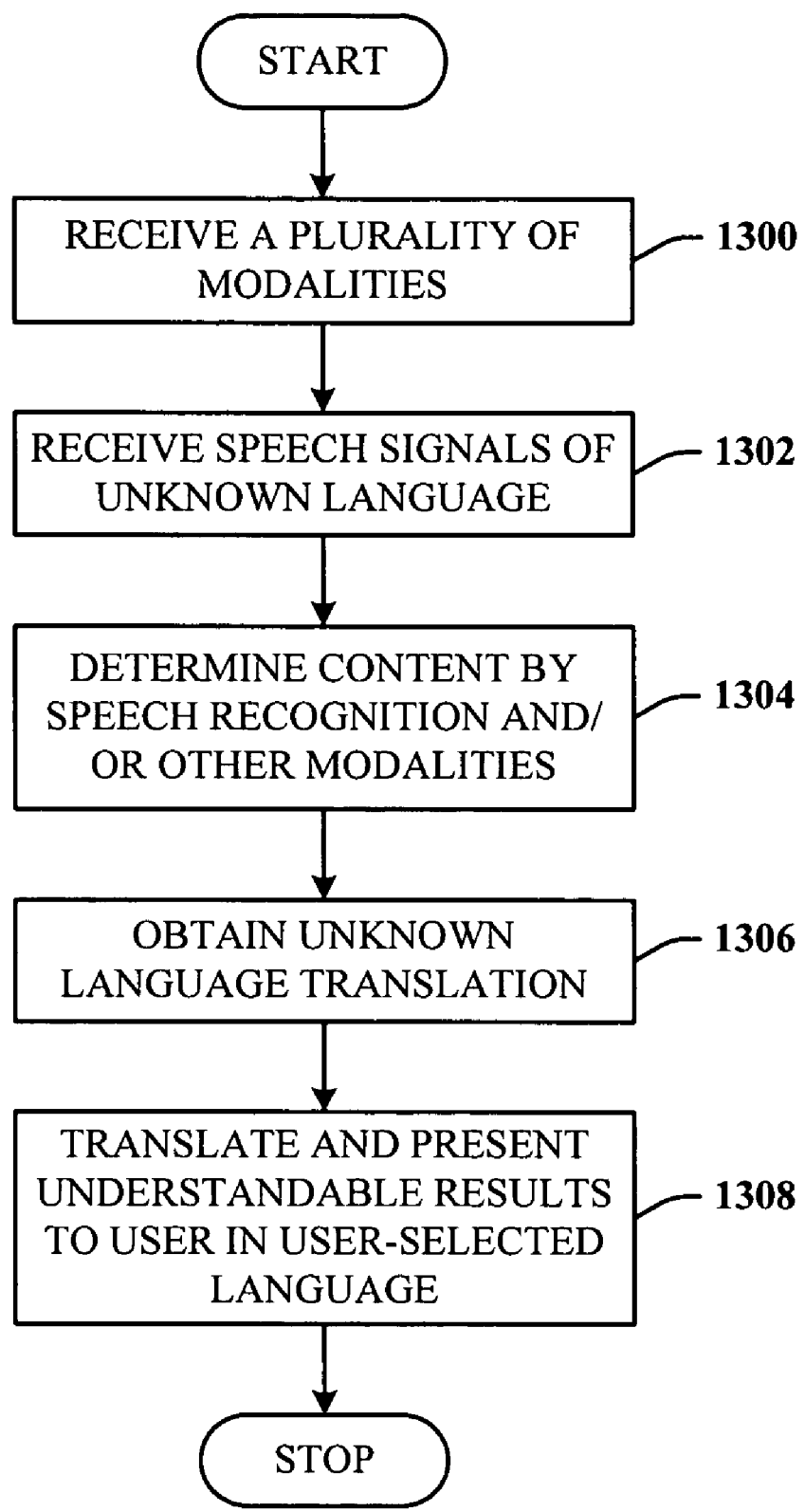
FIG. 13 illustrates a methodology of translating speech in accordance with an innovative aspect.

FIG. 13 illustrates a methodology of translating speech in accordance with an innovative aspect. At 1300, a plurality of modalities is received that capture information and output representative data. At 1302, speech signals are received in an unknown language. At 1304, the speech content is determined by speech recognition and/or in combination with other modalities. At 1306, the appropriate translation for the unknown language is obtained. At 1308, the input is translated and presented to the user as understandable results in a user-selected language. The presentation can be as audio and/or sentences of displayed text.

Figure 14:
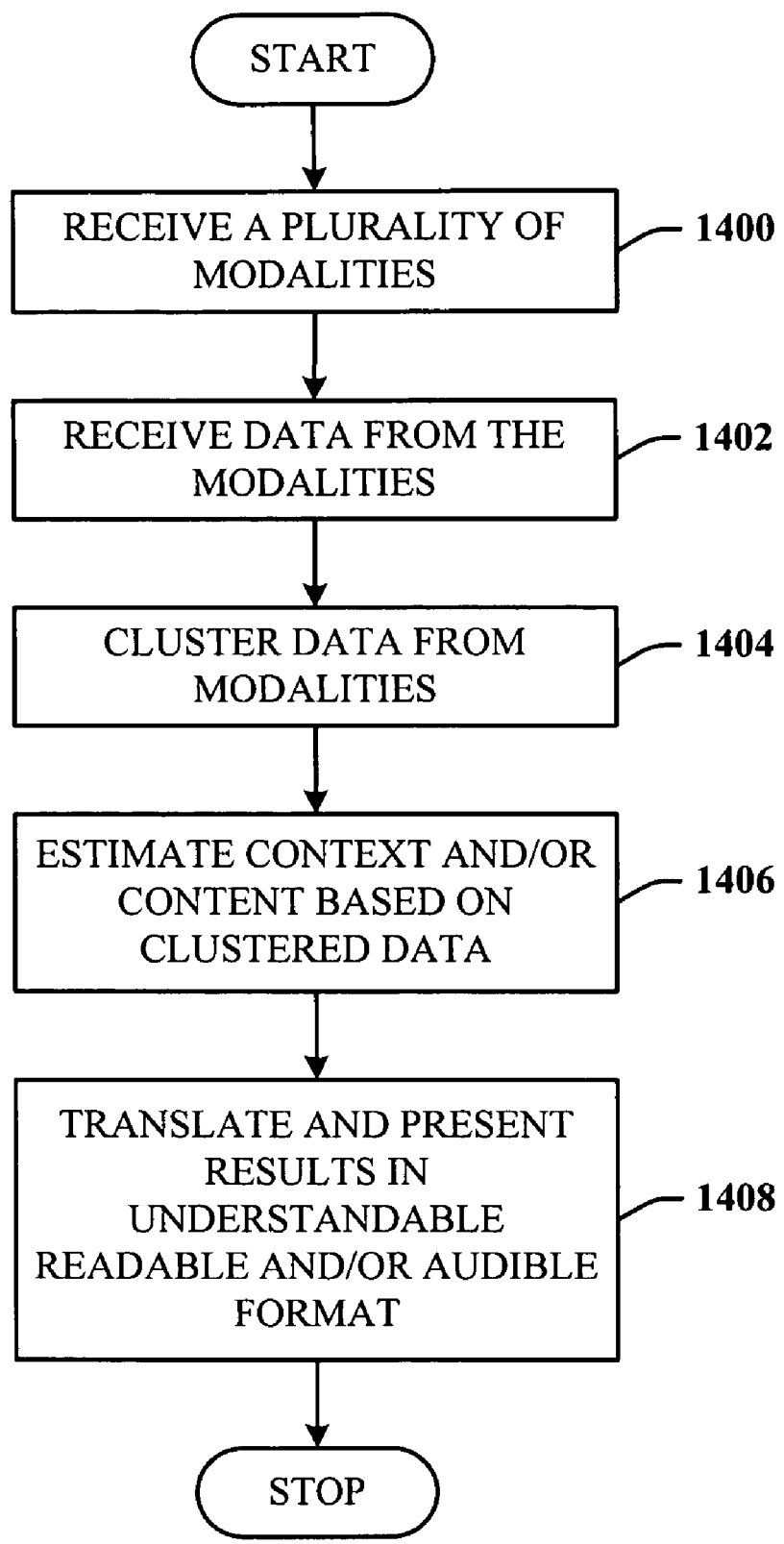
FIG. 14 illustrates a methodology of clustering sensed data to determined context.

FIG. 14 illustrates a methodology of clustering sensed data to determined context. At 1400, a plurality of modalities is received that capture information and output representative data. At 1402, data from the modalities is received, and processed into clusters of related data, as indicated at 1404. At 1406, the context and/or content are estimated based on the clustered data. At 1408, the clustered results are presented in an understandable readable and/or audible format.

Figure 15:
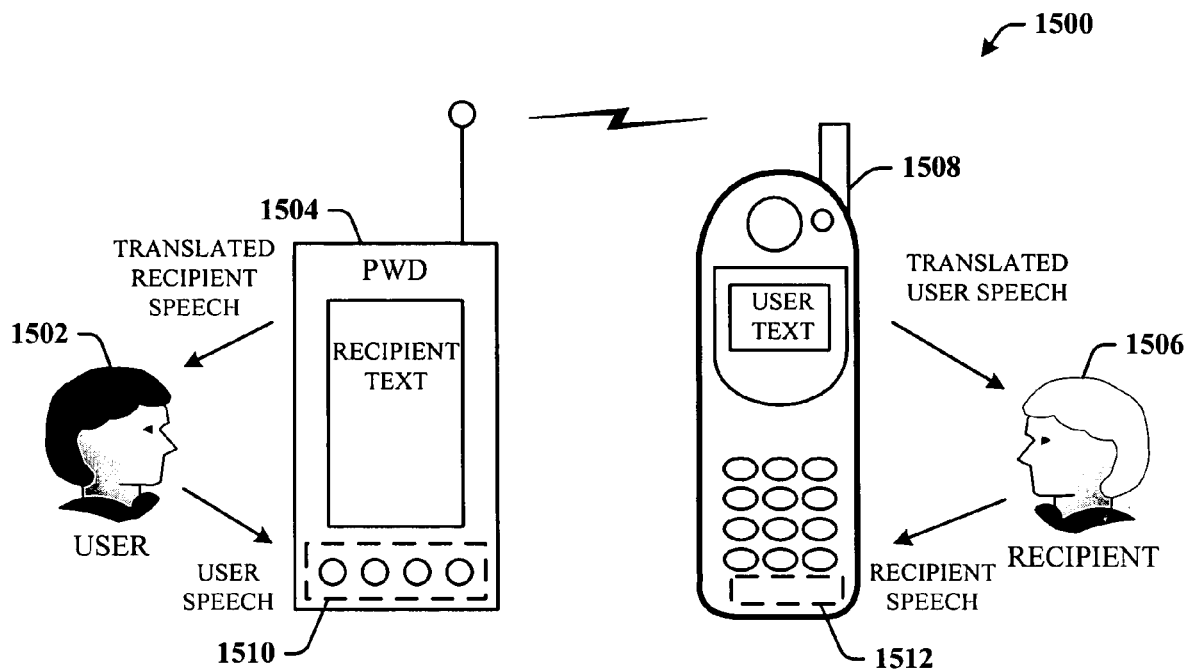
FIG. 15 illustrates a device-to-device translation system between a user and a recipient according to an aspect.

FIG. 15 illustrates a device-to-device translation system 1500 between a user and a recipient according to an aspect. A user 1502 utilizes a portable wireless device (PWD) 1504 (which includes the translation architecture of the subject innovation) to communicate wirelessly with a recipient 1506 via a recipient device 1508 (which also includes the translation architecture of the subject innovation). The user 1502 inputs speech signals to the user PWD 1504, which are then processed into translated output and communicated wirelessly to the recipient device 1508. The recipient device 1508 translates the user speech into user text, which can be displayed on the recipient device 1508, and/or output as translated user speech to the recipient 1506. Similarly, the user device 1504 translates the recipient speech into recipient text, which can be displayed on the user device 1504, and/or output as translated recipient speech to the user 1502.

If both the user 1502 and the recipient 1506 are located in the nearly the same context, either or both devices 1504 or/and 1508 can perform the content and/or context processing described supra, to enhance translation. Thus, the modalities 1510 and 1512 of either or both devices 1504 or/and 1508, respectively, can be employed to generated the desired translations.

Figure 16:
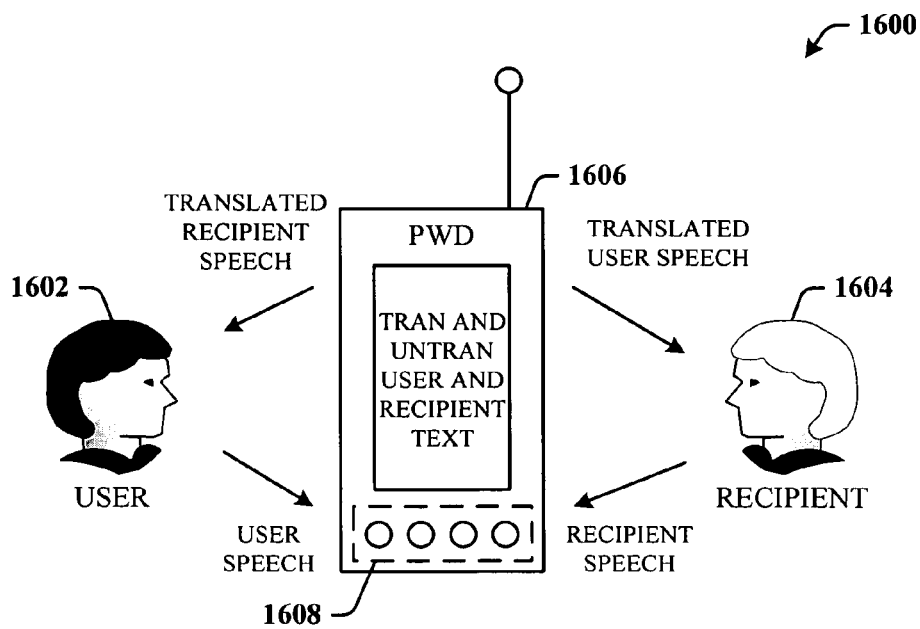
FIG. 16 illustrates a single device translation system according to another innovative aspect.

FIG. 16 illustrates a single device translation system 1600 between two persons according to another innovative aspect. A user 1602 and a recipient 1604 are face-to-face, for example, but cannot communicate effectively. The user speaks into the device 1606, which then processes the user speech into text understandable by the recipient 1604. The text can be displayed on the device 1606 in both the user language and the recipient language. Alternatively, or in combination therewith, the user speech can be presented to the recipient 1604 as translated user speech. Similarly, the device 1604 translates the recipient speech into recipient text, which can be displayed on the device 1604, and/or output as translated recipient speech to the user 1602. The device 1606 also includes modalities in the form of sensing components 1608 one or more of which can be provided in the device 1060 to facilitate improved translation in accordance with an innovative aspect.

Figure 17:
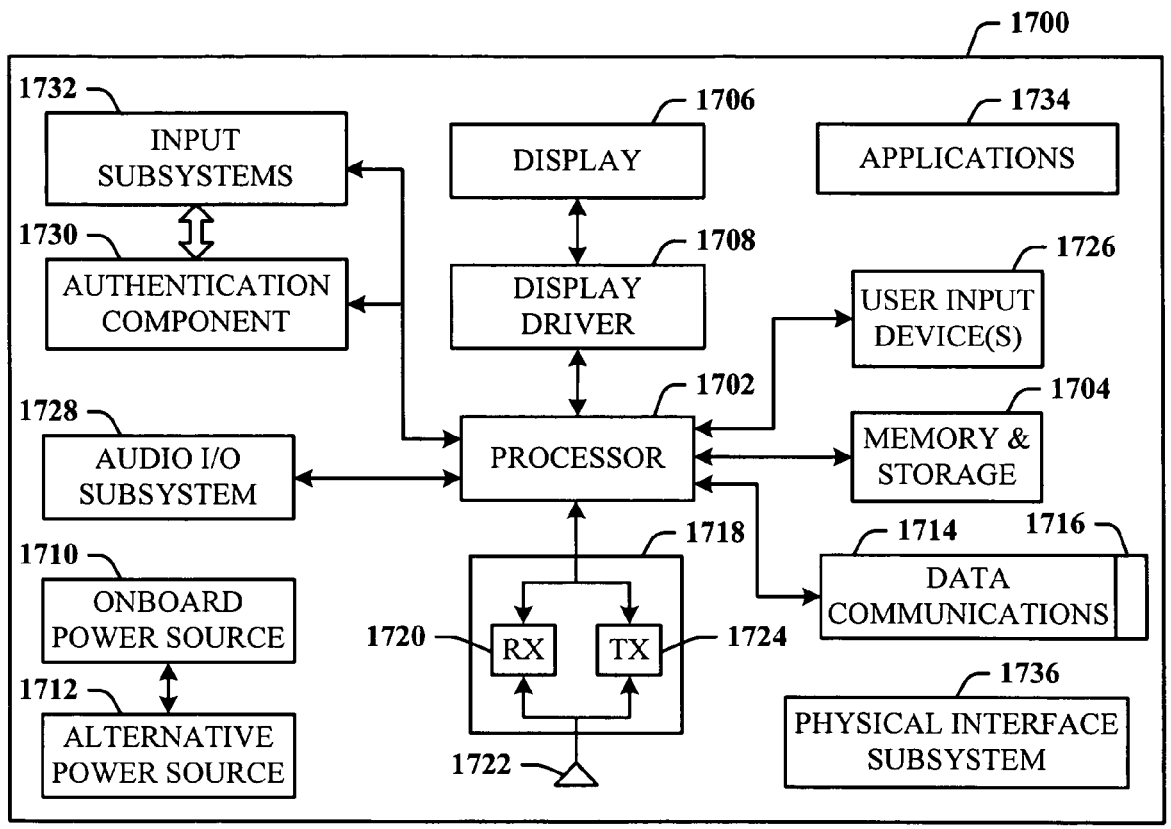
FIG. 17 illustrates a schematic block diagram of a portable wireless device that facilitates data translation according to an aspect of the subject innovation.

FIG. 17 illustrates a schematic block diagram of a PWD 1700 (e.g., a cell phone) that facilitates translation according to an aspect of the subject innovation. The device 1700 includes a processor 1702 that interfaces to one or more internal components for control and processing of data and instructions. The processor 1702 can be programmed to control and operate the various components within the device 1700 in order to carry out the various functions described herein. The processor 1702 can be any of a plurality of suitable processors (e.g., a DSP-digital signal processor), and can be a multiprocessor subsystem.

A memory and storage component 1704 interfaces to the processor 1702 and serves to store program code, and also serves as a storage means for information such as data, applications, services, metadata, device states, and the like. The memory and storage component 1704 can include non-volatile memory suitably adapted to store at least a complete set of the sensed data that is acquired from the sensing subsystem and/or sensors. Thus, the memory 1704 can include RAM or flash memory for high-speed access by the processor 1702 and/or a mass storage memory, e.g., a micro drive capable of storing gigabytes of data that comprises text, images, audio, and/or video content. According to one aspect, the memory 1704 has sufficient storage capacity to store multiple sets of information relating to disparate services, and the processor 1702 can include a program that facilitates alternating or cycling between various sets of information corresponding to the disparate services.

A display 1706 can be coupled to the processor 1702 via a display driver subsystem 1708. The display 1706 can be a color liquid crystal display (LCD), plasma display, touch screen display, or the like. The display 1706 functions to present data, graphics, or other information content. Additionally, the display 1706 can present a variety of functions that are user selectable and that provide control and configuration of the device 1700. In a touch screen example, the display 1706 can display touch selectable icons that facilitate user interaction for control and/or configuration.

Power can be provided to the processor 1702 and other onboard components forming the device 1700 by an onboard power system 1710 (e.g., a battery pack or fuel cell). In the event that the power system 1710 fails or becomes disconnected from the device 1700, an alternative power source 1712 can be employed to provide power to the processor 1702 and other components (e.g., sensors, image capture device, . . . ) and to charge the onboard power system 1710, if a chargeable technology. For example, the alternative power source 1712 can facilitate interface to an external a grid connection via a power converter. The processor 1702 can be configured to provide power management services to, for example, induce a sleep mode that reduces the current draw, or to initiate an orderly shutdown of the device 1700 upon detection of an anticipated power failure.

The device 1700 includes a data communications subsystem 1714 having a data communications port 1716, which port 1716 is employed to interface the device 1700 to a remote computing system, server, service, or the like. The port 1716 can include one or more serial interfaces such as a Universal Serial Bus (USB) and/or IEEE 1394 that provide serial communications capabilities. Other technologies can also be included, but are not limited to, for example, infrared communications utilizing an infrared communications port, and wireless packet communications (e.g., Bluetooth™, Wi-Fi, and Wi-Max). If a smartphone, the data communications subsystem 1714 can include SIM (subscriber identity module) data and the information necessary for cellular registration and network communications.

The device 1700 can also include a radio frequency (RF) transceiver section 1718 in operative communication with the processor 1702. The RF section 1718 includes an RF receiver 1720, which receives RF signals from a remote device or system via an antenna 1722 and can demodulate the signal to obtain digital information modulated therein. The RF section 1718 also includes an RF transmitter 1724 for transmitting information (e.g., data, service(s)) to a remote device or system, for example, in response to manual user input via a user input device 1726 (e.g., a keypad), or automatically in response to detection of entering and/or anticipation of leaving a communication range or other predetermined and programmed criteria.

The device 1700 can also include an audio I/O subsystem 1728 that is controlled by the processor 1702 and processes voice input from a microphone or similar audio input device (not shown). The audio subsystem 1728 also facilitates the presentation of speech and audio output signals via a speaker or similar audio output device (not shown).

The device 1700 can also include an authentication component 1730 that interfaces to the processor, and facilitates authentication of a user to the device itself and/or to a remote system. The processor 1702 also interfaces to an input subsystems block 1732 that facilitates the capture and input of the OCR data, voice data, handwriting data, and image/video data, for example. Additionally, the device 1700 includes one or more applications 1734 (e.g., imaging program, video presentation program, OCR program, search engine, . . . ) that can be launched to initiate document creation and content input in accordance with the innovative architecture.

The device 1700 can also include a physical interface subsystem 1736 that allows direct physical connection to another system (e.g., via a connector), rather than by wireless communications or cabled communications therebetween.

Figure 18:
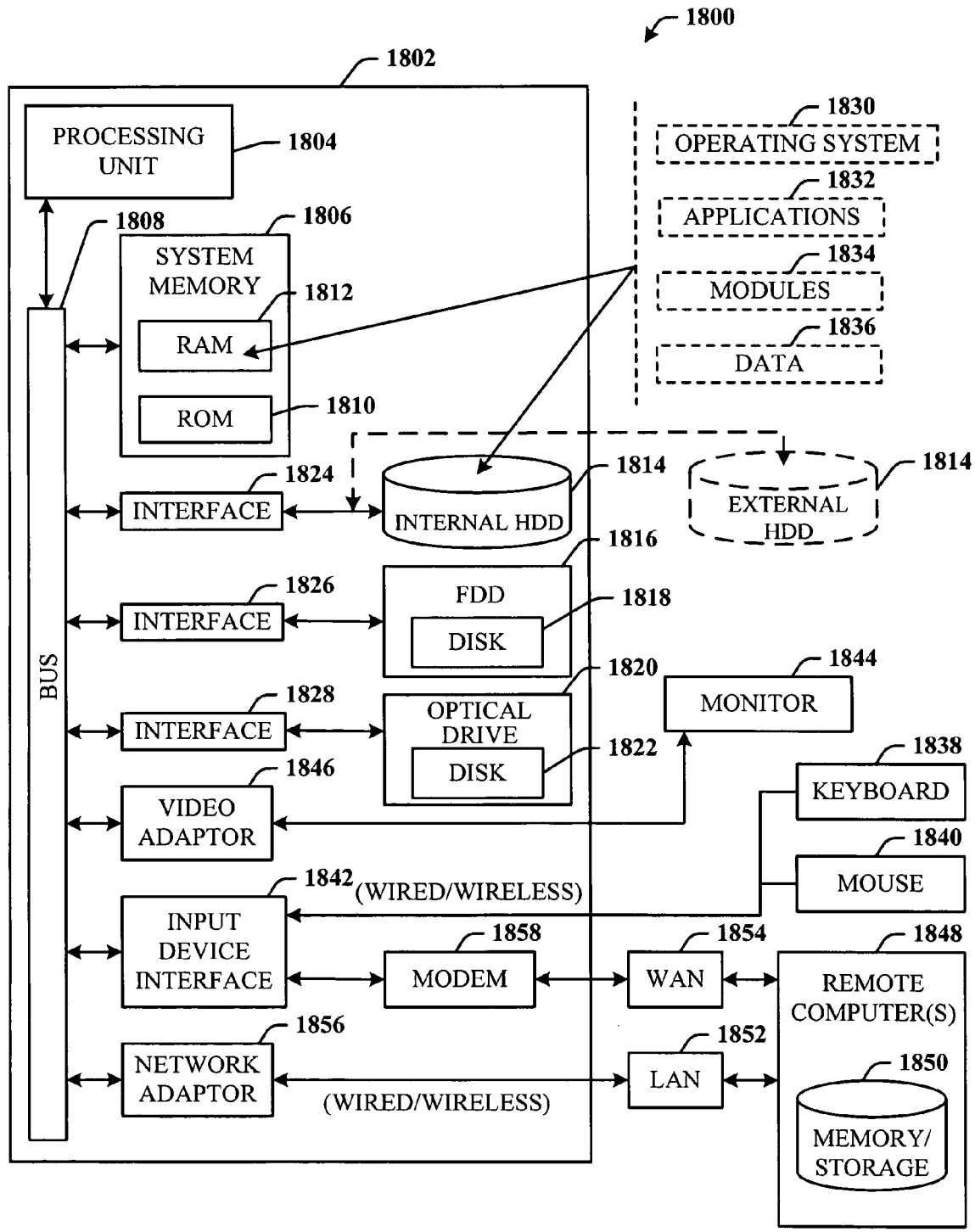
FIG. 18 illustrates a block diagram of a computer operable to execute the translation architecture the disclosed architecture.

Referring now to FIG. 18, there is illustrated a block diagram of a computer operable to execute the translation architecture the disclosed architecture. In order to provide additional context for various aspects thereof, FIG. 18 and the following discussion are intended to provide a brief, general description of a suitable computing environment 1800 in which the various aspects of the innovation can be implemented. While the description above is in the general context of computer-executable instructions that may run on one or more computers, those skilled in the art will recognize that the innovation also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects of the innovation may also be practiced in distributed computing environments where certain tasks are performed by remote processing devices that are linked through a communications network. In a distributed computing environment, program modules can be located in both local and remote memory storage devices.

A computer typically includes a variety of computer-readable media. Computer-readable media can be any available media that can be accessed by the computer and includes both volatile and non-volatile media, removable and non-removable media. By way of example, and not limitation, computer-readable media can comprise computer storage media and communication media. Computer storage media includes both volatile and non-volatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital video disk (DVD) or other optical disk storage, magnetic cassettes, magnetic tape, magnetic disk storage or other magnetic storage devices, or any other medium which can be used to store the desired information and which can be accessed by the computer.

Communication media typically embodies computer-readable instructions, data structures, program modules or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

With reference again to FIG. 18, the exemplary environment 1800 for implementing various aspects includes a computer 1802, the computer 1802 including a processing unit 1804, a system memory 1806 and a system bus 1808. The system bus 1808 couples system components including, but not limited to, the system memory 1806 to the processing unit 1804. The processing unit 1804 can be any of various commercially available processors. Dual microprocessors and other multi-processor architectures may also be employed as the processing unit 1804.

The system bus 1808 can be any of several types of bus structure that may further interconnect to a memory bus (with or without a memory controller), a peripheral bus, and a local bus using any of a variety of commercially available bus architectures. The system memory 1806 includes read-only memory (ROM) 1810 and random access memory (RAM) 1812. A basic input/output system (BIOS) is stored in a non-volatile memory 1810 such as ROM, EPROM, EEPROM, which BIOS contains the basic routines that help to transfer information between elements within the computer 1802, such as during start-up. The RAM 1812 can also include a high-speed RAM such as static RAM for caching data.

The computer 1802 further includes an internal hard disk drive (HDD) 1814 (e.g., EIDE, SATA), which internal hard disk drive 1814 may also be configured for external use in a suitable chassis (not shown), a magnetic floppy disk drive (FDD) 1816, (e.g., to read from or write to a removable diskette 1818) and an optical disk drive 1820, (e.g., reading a CD-ROM disk 1822 or, to read from or write to other high capacity optical media such as the DVD). The hard disk drive 1814, magnetic disk drive 1816 and optical disk drive 1820 can be connected to the system bus 1808 by a hard disk drive interface 1824, a magnetic disk drive interface 1826 and an optical drive interface 1828, respectively. The interface 1824 for external drive implementations includes at least one or both of Universal Serial Bus (USB) and IEEE 1394 interface technologies. Other external drive connection technologies are within contemplation of the subject innovation.

The drives and their associated computer-readable media provide nonvolatile storage of data, data structures, computer-executable instructions, and so forth. For the computer 1802, the drives and media accommodate the storage of any data in a suitable digital format. Although the description of computer-readable media above refers to a HDD, a removable magnetic diskette, and a removable optical media such as a CD or DVD, it should be appreciated by those skilled in the art that other types of media which are readable by a computer, such as zip drives, magnetic cassettes, flash memory cards, cartridges, and the like, may also be used in the exemplary operating environment, and further, that any such media may contain computer-executable instructions for performing the methods of the disclosed innovation.

A number of program modules can be stored in the drives and RAM 1812, including an operating system 1830, one or more application programs 1832, other program modules 1834 and program data 1836. All or portions of the operating system, applications, modules, and/or data can also be cached in the RAM 1812. It is to be appreciated that the innovation can be implemented with various commercially available operating systems or combinations of operating systems.

A user can enter commands and information into the computer 1802 through one or more wired/wireless input devices, e.g., a keyboard 1838 and a pointing device, such as a mouse 1840. Other input devices (not shown) may include a microphone, an IR remote control, a joystick, a game pad, a stylus pen, touch screen, or the like. These and other input devices are often connected to the processing unit 1804 through an input device interface 1842 that is coupled to the system bus 1808, but can be connected by other interfaces, such as a parallel port, an IEEE 1394 serial port, a game port, a USB port, an IR interface, etc.

A monitor 1844 or other type of display device is also connected to the system bus 1808 via an interface, such as a video adapter 1846. In addition to the monitor 1844, a computer typically includes other peripheral output devices (not shown), such as speakers, printers, etc.

The computer 1802 may operate in a networked environment using logical connections via wired and/or wireless communications to one or more remote computers, such as a remote computer(s) 1848. The remote computer(s) 1848 can be a workstation, a server computer, a router, a personal computer, portable computer, microprocessor-based entertainment appliance, a peer device or other common network node, and typically includes many or all of the elements described relative to the computer 1802, although, for purposes of brevity, only a memory/storage device 1850 is illustrated. The logical connections depicted include wired/wireless connectivity to a local area network (LAN) 1852 and/or larger networks, e.g., a wide area network (WAN) 1854. Such LAN and WAN networking environments are commonplace in offices and companies, and facilitate enterprise-wide computer networks, such as intranets, all of which may connect to a global communications network, e.g., the Internet.

When used in a LAN networking environment, the computer 1802 is connected to the local network 1852 through a wired and/or wireless communication network interface or adapter 1856. The adapter 1856 may facilitate wired or wireless communication to the LAN 1852, which may also include a wireless access point disposed thereon for communicating with the wireless adapter 1856.

When used in a WAN networking environment, the computer 1802 can include a modem 1858, or is connected to a communications server on the WAN 1854, or has other means for establishing communications over the WAN 1854, such as by way of the Internet. The modem 1858, which can be internal or external and a wired or wireless device, is connected to the system bus 1808 via the serial port interface 1842. In a networked environment, program modules depicted relative to the computer 1802, or portions thereof, can be stored in the remote memory/storage device 1850. It will be appreciated that the network connections shown are exemplary and other means of establishing a communications link between the computers can be used.

The computer 1802 is operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This includes at least Wi-Fi and Bluetooth™ wireless technologies. Thus, the communication can be a predefined structure as with a conventional network or simply an ad hoc communication between at least two devices.

Wi-Fi, or Wireless Fidelity, allows connection to the Internet from a couch at home, a bed in a hotel room, or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, etc.) to provide secure, reliable, fast wireless connectivity. A Wi-Fi network can be used to connect computers to each other, to the Internet, and to wired networks (which use IEEE 802.3 or Ethernet). Wi-Fi networks operate in the unlicensed 2.4 and 5 GHz radio bands, at an 11 Mbps (802.11a) or 54 Mbps (802.11b) data rate, for example, or with products that contain both bands (dual band), so the networks can provide real-world performance similar to the basic 10BaseT wired Ethernet networks used in many offices.

Figure 19:
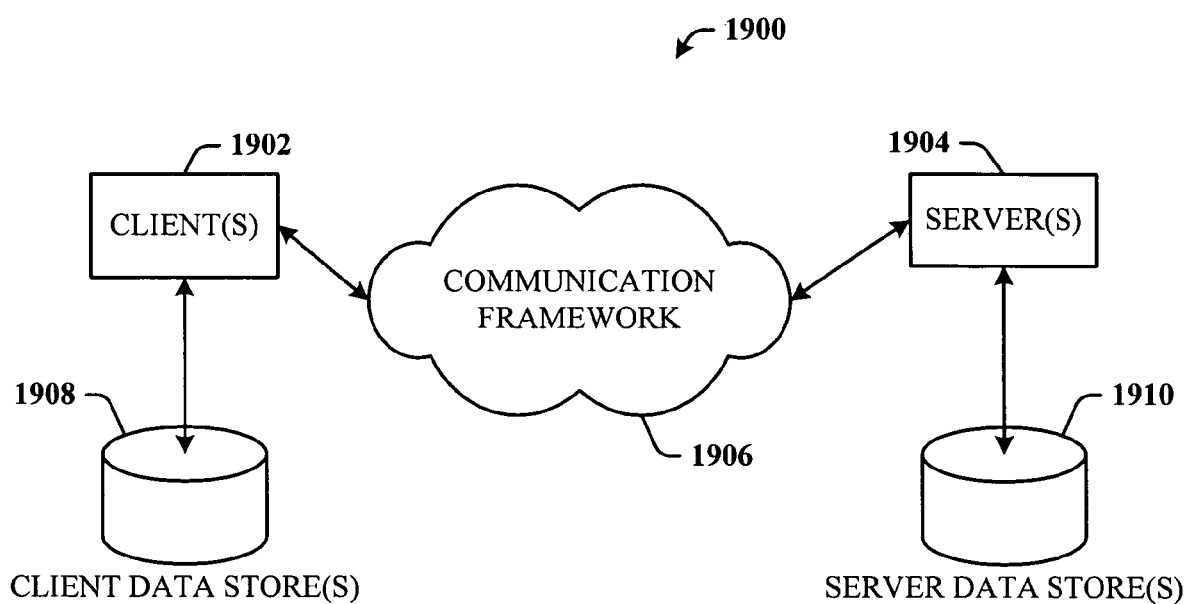
FIG. 19 illustrates a schematic block diagram of an exemplary computing environment for context and/or content processing in accordance with another aspect.

Referring now to FIG. 19, there is illustrated a schematic block diagram of an exemplary computing environment 1900 for context and/or content processing in accordance with another aspect. The system 1900 includes one or more client(s) 1902. The client(s) 1902 can be hardware and/or software (e.g., threads, processes, computing devices). The client(s) 1902 can house cookie(s) and/or associated contextual information by employing the subject innovation, for example.

The system 1900 also includes one or more server(s) 1904. The server(s) 1904 can also be hardware and/or software (e.g., threads, processes, computing devices). The servers 1904 can house threads to perform transformations by employing the invention, for example. One possible communication between a client 1902 and a server 1904 can be in the form of a data packet adapted to be transmitted between two or more computer processes. The data packet may include a cookie and/or associated contextual information, for example. The system 1900 includes a communication framework 1906 (e.g., a global communication network such as the Internet) that can be employed to facilitate communications between the client(s) 1902 and the server(s) 1904.

Communications can be facilitated via a wired (including optical fiber) and/or wireless technology. The client(s) 1902 are operatively connected to one or more client data store(s) 1908 that can be employed to store information local to the client(s) 1902 (e.g., cookie(s) and/or associated contextual information). Similarly, the server(s) 1904 are operatively connected to one or more server data store(s) 1910 that can be employed to store information local to the servers 1904.

What has been described above includes examples of the disclosed innovation. It is, of course, not possible to describe every conceivable combination of components and/or methodologies, but one of ordinary skill in the art may recognize that many further combinations and permutations are possible. Accordingly, the innovation is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A system that facilitates data translation, comprising:
   a processor; and
   memory coupled to the processor;
   an input component stored in the memory and executable on the processor that processes input data received from a plurality of sources that represent context and content, wherein the input component processes the input data to determine which linguistic language is represented by the context and the content, and
   extracts text from the input data to generate query terms and employs the query terms with a search engine to determine a first linguistic language;
   wherein the context is established based on at least one of video, image data or scanned document indicia, and the determined linguistic language comprises the first linguistic language;
   a translation component stored in the memory and executable on the processor that translates the processed input data into a translated output in a second linguistic language which includes at least one of text or audible signals for perception by a recipient, the first linguistic language being different from the second linguistic language; and
   a feedback component stored in the memory and executable on the processor that receives, in response to the translated output, feedback in the second linguistic language from the recipient relating to accuracy of the translation, wherein the feedback is employed as additional input data to provide a new translated output in the second linguistic language, and wherein the feedback is employed as additional input data for establishing the context.

2. The system of claim 1, wherein audible signals in the second linguistic language are understandable utterances to the recipient.

3. The system of claim 1, wherein text in the second linguistic language is understandable utterances to the recipient.

4. The system of claim 1, wherein the input component is further configured to process image data included in the input data via optical character recognition to extract text from the image data and employ the text to determine the first linguistic language.

5. The system of claim 1, wherein the input data includes speech signals from a user in the first linguistic language which are translated into the second linguistic language for understandable perception of the recipient.

6. The system of claim 5, wherein the speech signals translated into the second linguistic language are presented understandably in at least one of the text in the second linguistic language to the recipient via a display or the audible signals in the second linguistic language to the recipient via an audio system.

7. The system of claim 1, wherein the input component is further configured to process the audio data included in the input data via speech recognition into text to determine the first linguistic language.

8. The system of claim 1, further comprising an assembler component that assembles translated words into sentences in the second linguistic language which are understandable by the recipient.

9. The system of claim 1, wherein the sources of the input component are selectable by the recipient in order to form the translated output.

10. A computer-implemented method of translating data, comprising:
  receiving one or more input data from one or more sensing sources, wherein the one or more sensing sources comprise at least one of audio, video, global positioning, or image sensing sources;
  generating context data of at least one of the one or more input data, the generating context data including:
  extracting text from at least one of the one or more input data to generate query terms and employing the query terms with a search engine to determine a first linguistic language;
  translating one or more results from the search engine into a translated output in a second linguistic language;
  presenting the translated output to a recipient in the second linguistic language that is understandable by the recipient;
  receiving a user feedback in the second linguistic language from the recipient, wherein the user feedback includes an indication that the translation is successful or unsuccessful;
  establishing the context of the at least one of the one or more input data based on the user feedback; and
  employing the established context as an additional input for translating the content.

11. The method of claim 10, further comprising an act of selecting the translated output to be formatted as audio signals in a form of speech in the second linguistic language.

12. The method of claim 10, further comprising an act of assembling words representative of at least one of the context data and content data into sentences in the second linguistic language.

13. The method of claim 10, further comprising an act of employing global positioning system (GPS) data included in the one or more input data to determine the first linguistic language.

14. The method of claim 10, further comprising an act of searching at least one of a local data store or a network-based resource for contextual information to determine the first linguistic language, wherein the searching employs the text included in the at least one of the one or more input data.

15. The method of claim 10, further comprising an act of extracting text from one or more images included in the at least one of the one or more input data to determine the translated output.

16. A method comprising:
  under control of one or more processors configured with executable instructions:
  receiving one or more inputs from one or more sensing sources, the one or more inputs comprising image data and/or video data, the image data and/or video comprise a gesture;
  determining context of at least one of the one or more inputs; the determining comprising using the gesture to identify or narrow information to determine the context;
  extracting text from the one or more inputs to generate query terms and employing the query terms with a search engine to determine a first linguistic language;
  translating an input of the one or more inputs into a translated output in a second linguistic language based at least upon the context of the at least one of the one or more inputs;
  receiving a user feedback of the translated output; and
  producing a new translated output based at least upon the user feedback.

17. The method of claim 16, wherein the gesture is further used to enhance input recognition, urgency and emotional interaction of a user.

* * * * *